(12) United States Patent
Sooy et al.

(10) Patent No.: US 9,399,910 B2
(45) Date of Patent: Jul. 26, 2016

(54) INSPECTION SYSTEM AND METHOD FOR USE IN UNDERGROUND BORING OPERATIONS

(75) Inventors: Josh Sooy, North Ridgeville, OH (US); Michael J. Rutkowski, Brunswick, OH (US); Jon R. Dunkin, Elyria, OH (US)

(73) Assignee: Emerson Electric Co., St. Louis, MO (US)

(*) Notice: Subject to any disclaimer, the term of this patent is extended or adjusted under 35 U.S.C. 154(b) by 288 days.

(21) Appl. No.: 14/234,051

(22) PCT Filed: Jul. 19, 2012

(86) PCT No.: PCT/US2012/047290
§ 371 (c)(1),
(2), (4) Date: Jan. 21, 2014

(87) PCT Pub. No.: WO2013/012981
PCT Pub. Date: Jan. 24, 2013

(65) Prior Publication Data
US 2014/0192180 A1    Jul. 10, 2014

Related U.S. Application Data

(60) Provisional application No. 61/510,182, filed on Jul. 21, 2011, provisional application No. 61/603,552, filed on Feb. 27, 2012.

(51) Int. Cl.
*H04N 7/18* (2006.01)
*H04N 9/47* (2006.01)
*E21B 47/00* (2012.01)
*G03B 37/00* (2006.01)

(52) U.S. Cl.
CPC .......... *E21B 47/0002* (2013.01); *G03B 37/005* (2013.01)

(58) Field of Classification Search
None
See application file for complete search history.

(56) References Cited

U.S. PATENT DOCUMENTS

| | | |
|---|---|---|
| 3,268,965 A | 8/1966 | Arthur |
| 3,680,461 A | 8/1972 | Amesbury et al. |
| 4,362,413 A | 12/1982 | Heard et al. |
| 4,862,550 A | 9/1989 | Batchelor |
| 4,921,374 A | 5/1990 | Stutzman |
| 5,276,949 A | 1/1994 | Cordellini |

(Continued)

FOREIGN PATENT DOCUMENTS

CN         2560977 Y       7/2003

OTHER PUBLICATIONS

International Search Report and Written Opinion for PCT/US2012/047290, mailed Oct. 1, 2012; ISA/US.

(Continued)

*Primary Examiner* — Hung Dang

(57) ABSTRACT

An inspection system and method for use in underground utility construction, especially underground boring operations, is provided. The inspection system generally includes a sensor, a sensor carrier apparatus, and an output device. The sensor is employed to obtain inspection data regarding the condition of a tunnel created in an underground boring operation. The sensor carrier is adapted to incorporate the sensor and connect to means for transporting the sensor through the tunnel. The output device receives an output signal from the sensor corresponding to the inspection data and presents it to an operator for interpretation and/or otherwise documents and/or records the inspection data.

37 Claims, 15 Drawing Sheets

(56) References Cited

U.S. PATENT DOCUMENTS

| | | |
|---|---|---|
| 5,652,617 A | 7/1997 | Barbour |
| 6,467,554 B1 | 10/2002 | Millican |
| 7,011,166 B2 | 3/2006 | Koch et al. |
| 2002/0162406 A1 | 11/2002 | Wentworth et al. |
| 2007/0297778 A1 | 12/2007 | Lange |
| 2010/0059219 A1* | 3/2010 | Roberts ............... E21B 47/0002 166/250.01 |
| 2010/0206580 A1* | 8/2010 | Tessari .................... E21B 10/64 166/377 |
| 2012/0169841 A1* | 7/2012 | Chemali ............. E21B 47/0002 348/36 |
| 2013/0008723 A1* | 1/2013 | Hoelting ................... E21B 3/02 175/317 |

OTHER PUBLICATIONS

International Preliminary Report on Patentability (Chapter II) for PCT/US2012/047290, dated Aug. 1, 2013; IPEA/US.

Chunwen, Yan, etc; Schanghai Scientific & Technical Publishers, "Engineering Technology for Non-excavating Laying of Underground Pipeline", pp. 124-129, Figure 5-3, Jan. 31, 2005 (Summary attached).

* cited by examiner

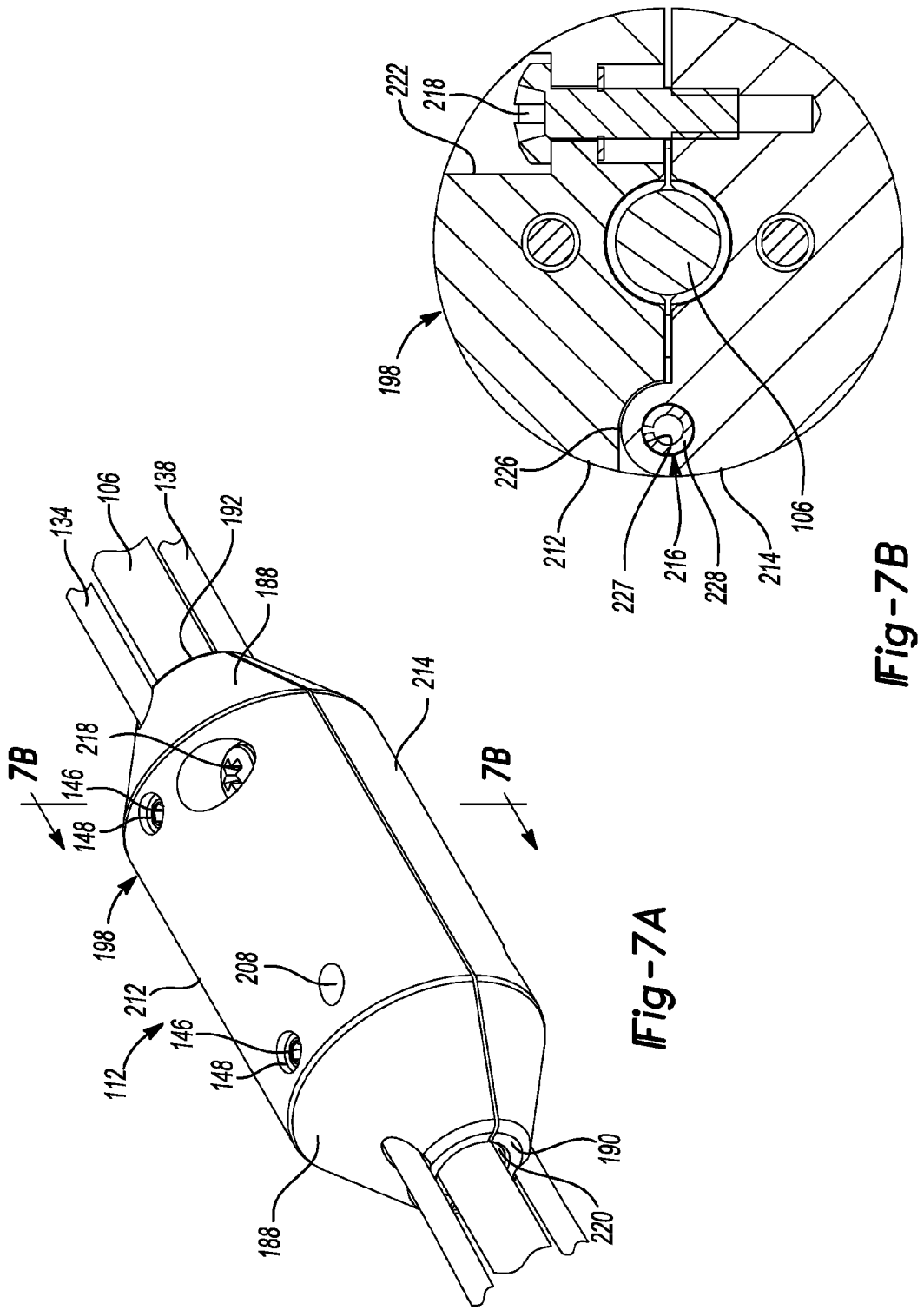

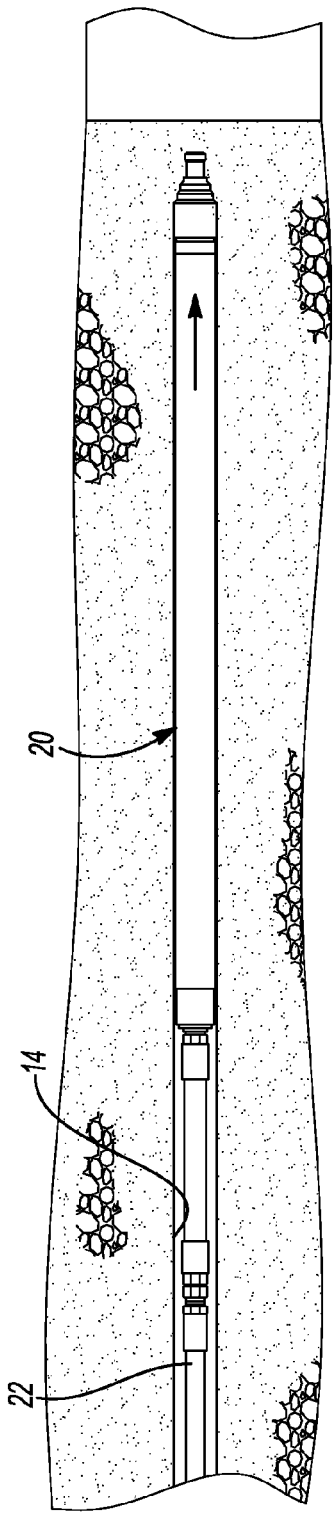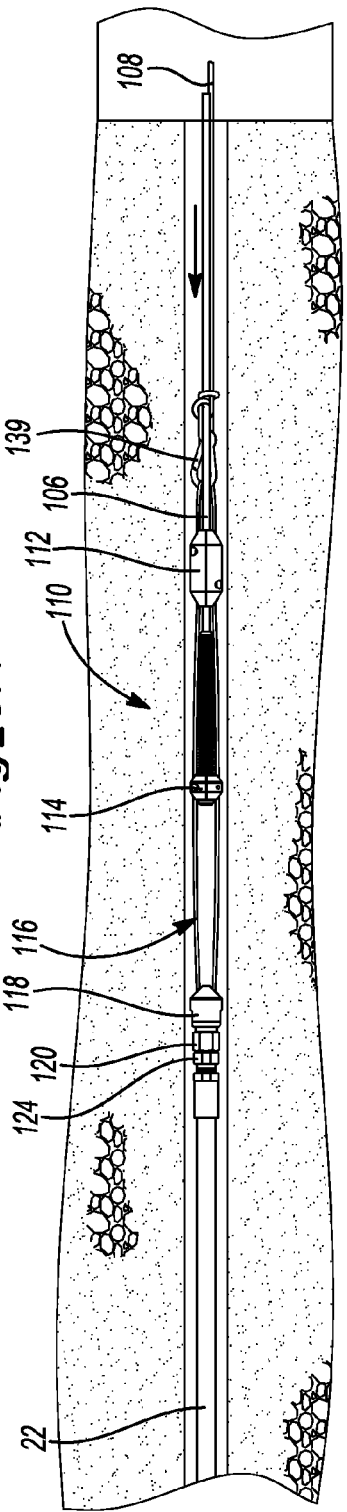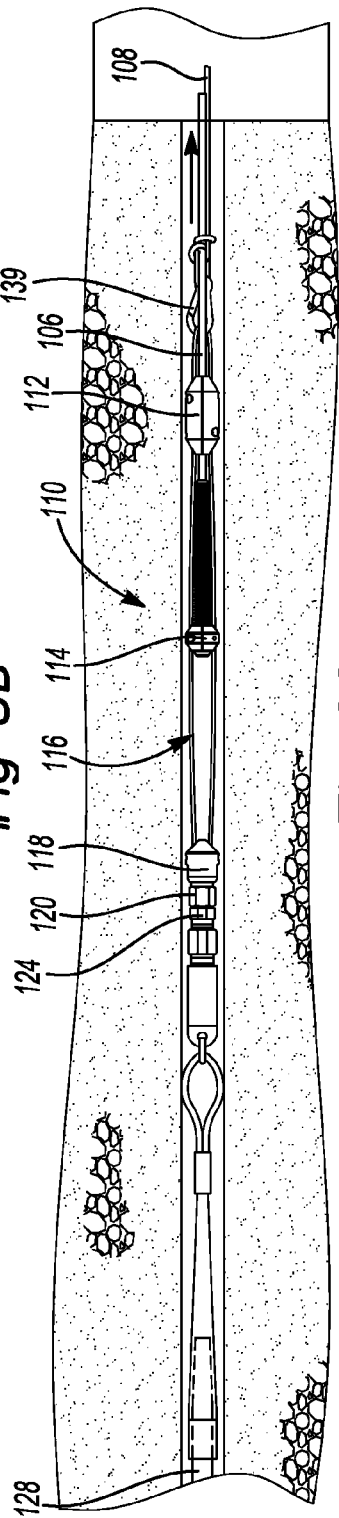

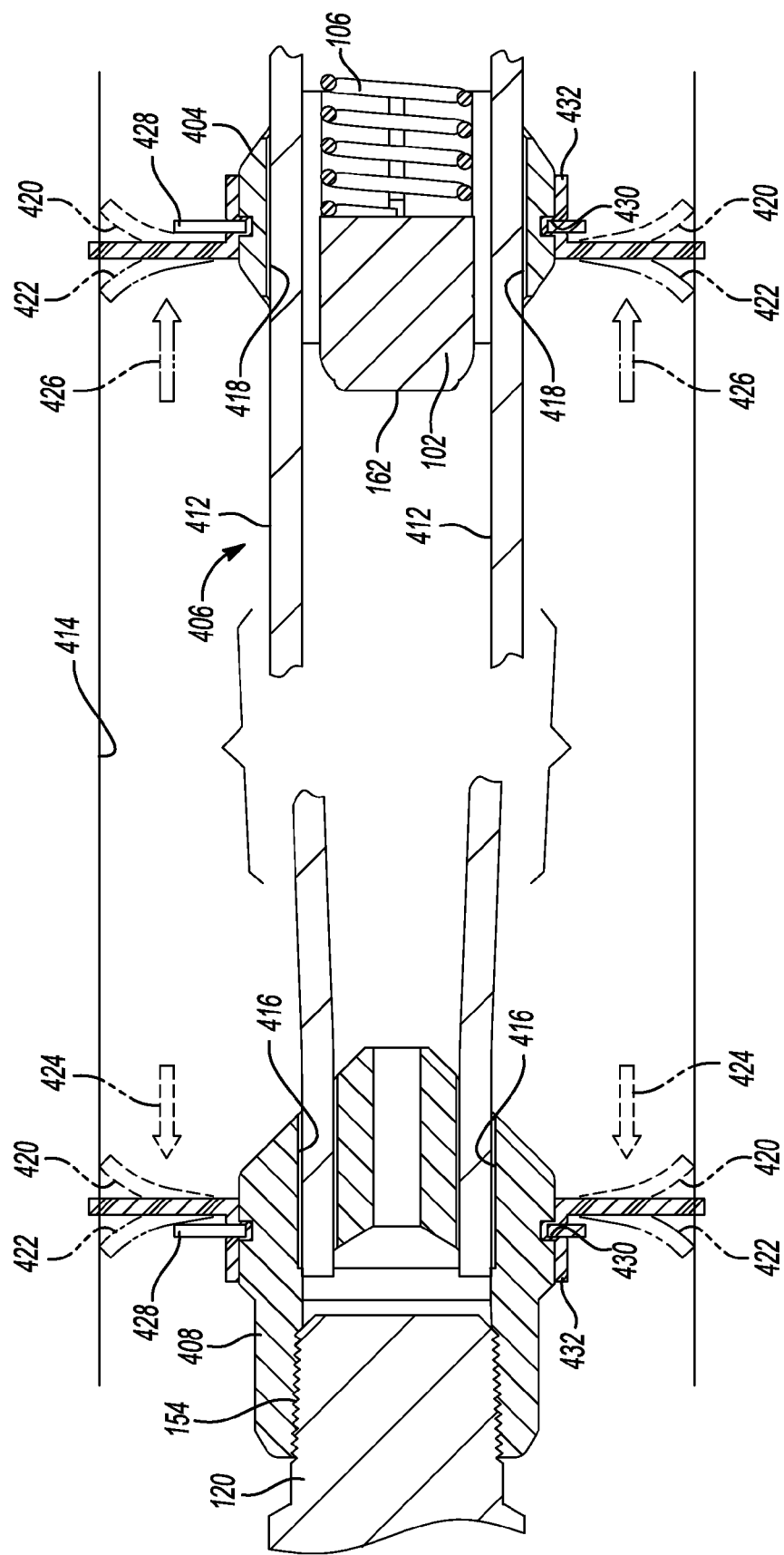

INSPECTION SYSTEM AND METHOD FOR USE IN UNDERGROUND BORING OPERATIONS

CROSS-REFERENCE TO RELATED APPLICATIONS

This application is a 371 U.S. National Stage of International Application No. PCT/US2012/047290, filed on Jul. 19, 2012, which claims the benefit and priority of U.S. Patent Application 61/603,552, filed on Feb. 27, 2012, and U.S. Patent Application 61/510,182, filed on Jul. 21, 2011. The entire disclosures of the above applications are incorporated herein by reference.

FIELD

The present disclosure relates generally to the field of underground utility construction and, more particularly, to an inspection system and method for use in underground boring operations to assist in preventing utility line crossbores.

BACKGROUND

This section provides background information related to the present disclosure which is not necessarily prior art.

Underground utility lines are sometimes installed using any of a variety of trenchless installation technologies, including horizontal boring technologies. Horizontal boring technologies provide efficient and cost effective ways to install gas, water, electric and communications lines, particularly when it is difficult or cost prohibitive to plow or trench the ground, such as when there are ground obstructions (e.g., a road, sidewalk, driveway, or landscaping) along the path of the utility line that prevent those techniques. Some horizontal boring technologies include underground pneumatic boring, auger boring, wet boring, horizontal directional drilling (HDD), impact moling, pipe jacking and microtunneling.

The process of underground pneumatic boring involves launching a pneumatic boring or piercing tool that creates a horizontal bore hole along a straight path to create a tunnel through the ground. A utility line (e.g., for gas, water, electric or communications) can then be pulled back through the tunnel for installation underground.

A conventional system and method for underground pneumatic boring can be understood with reference to FIGS. 1A, 1B and 1C. In an area 10 where a new underground utility line is to be installed, the existing utility lines and a surface obstacle 12 (e.g., a road) to be traversed by the new utility line is surveyed. Then a path along which to create an underground bore or tunnel 14 for the new utility line is chosen. Thereafter, two pits are excavated on the opposite sides of the obstacle; a pit 16 at the path's origin (the entrance pit) and a pit 18 at its target destination (the exit pit). The pits 16, 18 are large enough to fit a boring tool 20 and to permit an operator to work. The pits are also deep enough so that as the boring tool 20 creates the tunnel 14, the surface of the ground above it remains undisturbed.

The boring tool 20, shown best in FIG. 1C, is a well-known device and comprises a pneumatically-operated boring tool that cuts through soil, rock, etc. The boring tool 20 is connected to a supply of compressed air by an air supply hose 22. A guide tool 24 and a sighting device 26 (both shown in FIG. 1B) are used to align the boring tool along the desired path and toward the intended destination. The boring tool 20 is then activated and it proceeds to cut the tunnel 14, advancing through the wall of the entrance pit with the air supply hose 22 following behind it. Once the boring tool 20 has progressed beyond the guide tool 24, the location of the boring tool 20 is tracked through the ground with a radio frequency receiver that detects a radio signal generated by a radio transmitter that is built into the boring tool.

When the boring tool 20 reaches the target destination, it has completed the tunnel 14 through which the new utility line can be run, between the entrance and exit pits 16, 18 and beneath the surface obstacle 12. The boring tool 20 is then removed from the air supply hose 22. The utility line is then attached to the air supply hose 22 (such as by taping the utility line to the hose 22), and the hose 22 and utility line are pulled back through the tunnel together, thereby installing the utility line underground.

Underground pneumatic boring, however, has drawbacks which can result in difficulties in completing a bore for an underground utility line. For example, the boring tool is not steerable, and once it has exited the guide tool the operator no longer has control over the boring tool's trajectory. Consequently, the boring tool can be deflected from the desired path by rocks and different soil densities, for example. Even minor deflections can cause significant deviations from the desired path over long distances. Consequently, the boring tool could unintentionally cross the path of other already existing underground utilities. Therefore, and notwithstanding the fact that existing underground utility lines are located and marked from above ground before the pneumatic boring underground is carried out, it is possible that the boring tool can tunnel through an existing utility line, such as a sanitary sewer line, without the operator knowing. Then, when the new utility line is installed it would run right through the existing sewer line. In such an instance, a crossbore—that is, an intersection of two or more underground utilities—is created.

A significant concern for the underground utility construction industry, regardless of the horizontal boring process employed, is unknowingly tunneling through a sewer line and thereafter running a utility line, such as a natural gas pipeline or power line, through the sewer line. The crossbored utility line may remain in place for months or years before a blockage develops in the sewer line. Then, in the process of clearing the sewer line, the utility line can be severed, ruptured, or otherwise damaged by a power drain auger or other tool or machine that is used to clear the sewer line. Any resulting damage to the crossbored utility line can lead to a catastrophic failure, such as an explosion, if the crossbored utility line is a gas line; or injury to the operator of the sewer cleaning machine if the crossbored utility line is a power line; or disruption of services if the crossbored utility line is a communications line, for example.

SUMMARY

This section provides a general summary of the disclosure, and is not a comprehensive disclosure of its full scope or all of its features.

The disclosure is generally directed to an inspection system and method for use in the underground utility construction industry, and particularly in underground boring operations. The inspection system generally includes a sensor, a sensor carrier, and an output device. The sensor is employed to obtain inspection data regarding the condition of the tunnel created by a boring tool connected to a retrieval mechanism. The sensor carrier is adapted to incorporate the sensor and connect to the retrieval mechanism to transport the sensor through the tunnel. The output device receives an output signal from the sensor corresponding to the inspection data and presents it to an operator for interpretation and/or otherwise documents and/or records the inspection data.

In an exemplary aspect, the disclosure is directed to a visual inspection system and method for its use in underground boring operations to assist in preventing utility line crossbores. The visual inspection system includes a small camera that is configured for travel through the tunnel created in an underground pneumatic boring operation before a new utility line is run. As the camera traverses through the tunnel, an operator can view real-time images (e.g., still pictures and/or video) of the tunnel on a display device and make a visual inspection of the tunnel to determine whether another already existing utility line, such as a sanitary sewer line, has been intersected during the boring operation. By doing so, the potential for crossbores is significantly reduced. In addition, of course, the inspection images can be recorded to document the underground boring operation, that no crossbores were created, that no underground utilities were damaged, and/or that there were no other obstacles in the path of the tunnel.

The visual inspection system is disclosed to comprise a camera, a display, and a camera rigging. The camera rigging includes a frame, a camera connector clamp, a camera guide, and a connector fitting that adapts the camera rigging for connection to an end of an air hose, a utility line, and/or a drill bit.

A method according to the disclosure for visually inspecting an underground bore for potential crossbores comprises creating an underground tunnel for a utility line using a boring tool, removing the boring tool from an air supply hose, attaching a camera to the air supply hose by way of a camera rigging, pulling the air supply hose and the camera through the tunnel, visually inspecting the tunnel, disconnecting the air supply hose from the camera rigging, attaching a utility line to the camera rigging and pulling the camera rigging and the utility line through the tunnel. Another method according to the disclosure for visually inspecting an underground bore for potential crossbores comprises creating an underground tunnel for a utility line using a drill bit, attaching a camera to the drill bit by way of a camera rigging, pulling the drill bit and the camera through the tunnel, visually inspecting the tunnel, disconnecting the drill bit from the camera rigging, attaching a utility line to the camera rigging, and pulling the camera rigging and the utility line through the tunnel.

Further areas of applicability will become apparent from the description provided herein. The description and specific examples in this summary are intended for purposes of illustration only and are not intended to limit the scope of the present disclosure. For example, a variety of different sensor technologies could be employed in the inspection system, in addition to a camera that obtains inspection data in the form of visible images. Other sensors that alternatively could be employed, for example, are passive sensors like touch sensors, infrared sensors and vapor sensors, or active sensors like sonar, radar and laser. Consequently, the underground tunnels can be inspected for other conditions in addition to crossbores.

DRAWINGS

The drawings described herein are for illustrative purposes only of selected embodiments and not all possible implementations, and are not intended to limit the scope of the present disclosure.

FIGS. 7A and 7B are rear perspective views of a portion of the camera rigging of FIG. 2, including a camera connector clamp, shown in a closed position and an open position, respectively.

FIGS. 8A, 8B, and 8C are schematic diagrams illustrating a method for using a visual inspection system according to the present disclosure in conjunction with underground pneumatic boring.

Figure 9A:
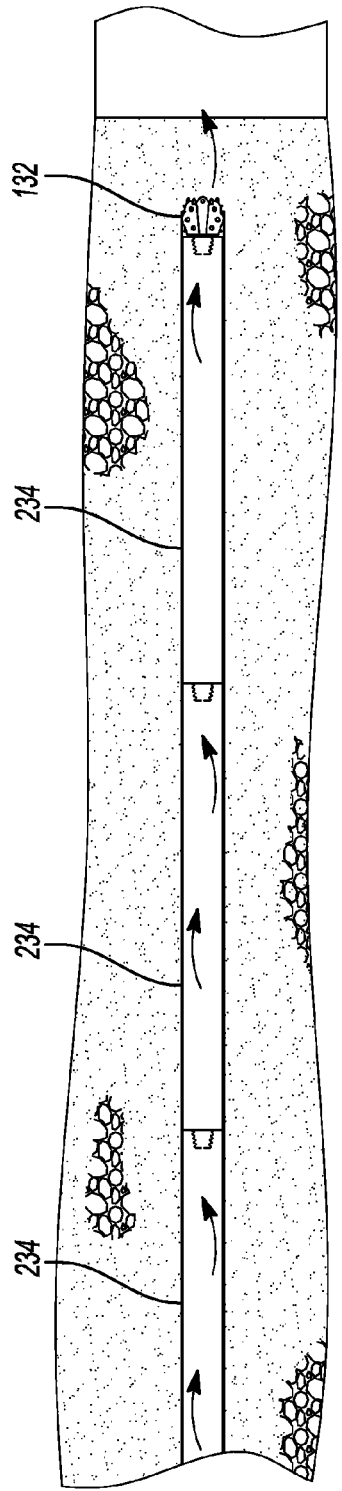
Figure 9B:
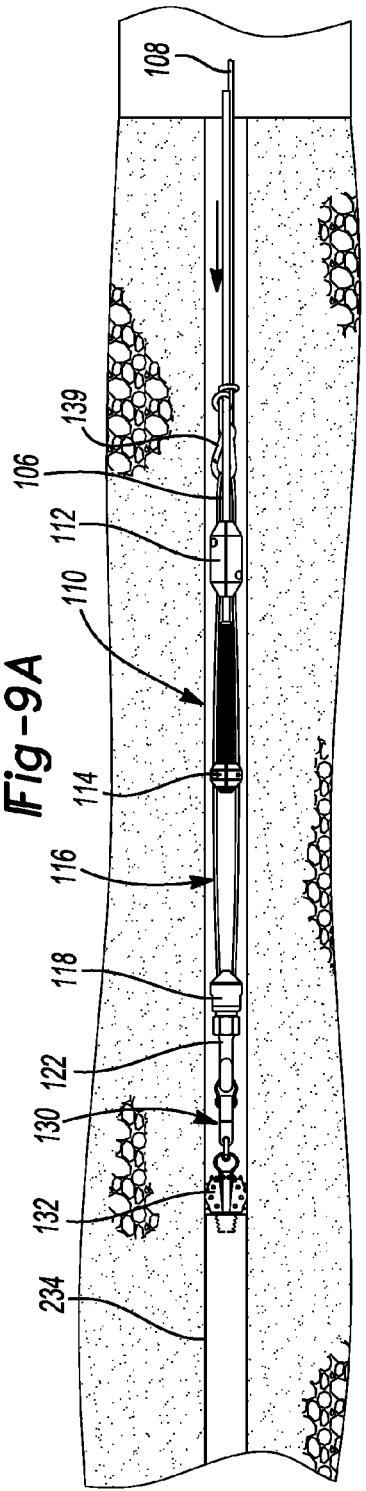
Figure 9C:
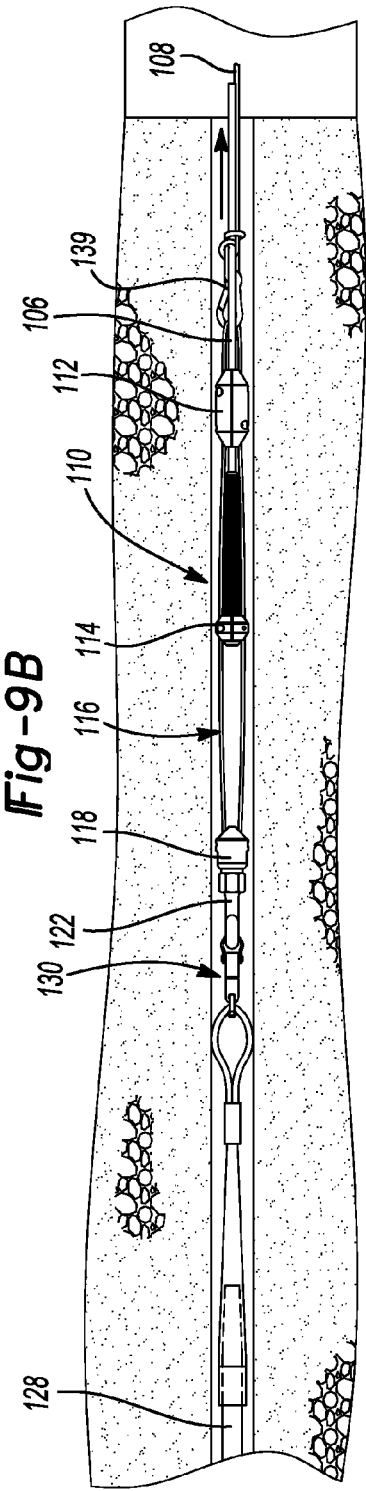

FIGS. 9A, 9B, and 9C are schematic diagrams illustrating a method for using a visual inspection system according to the present disclosure in conjunction with horizontal directional drilling.

Figure 10:
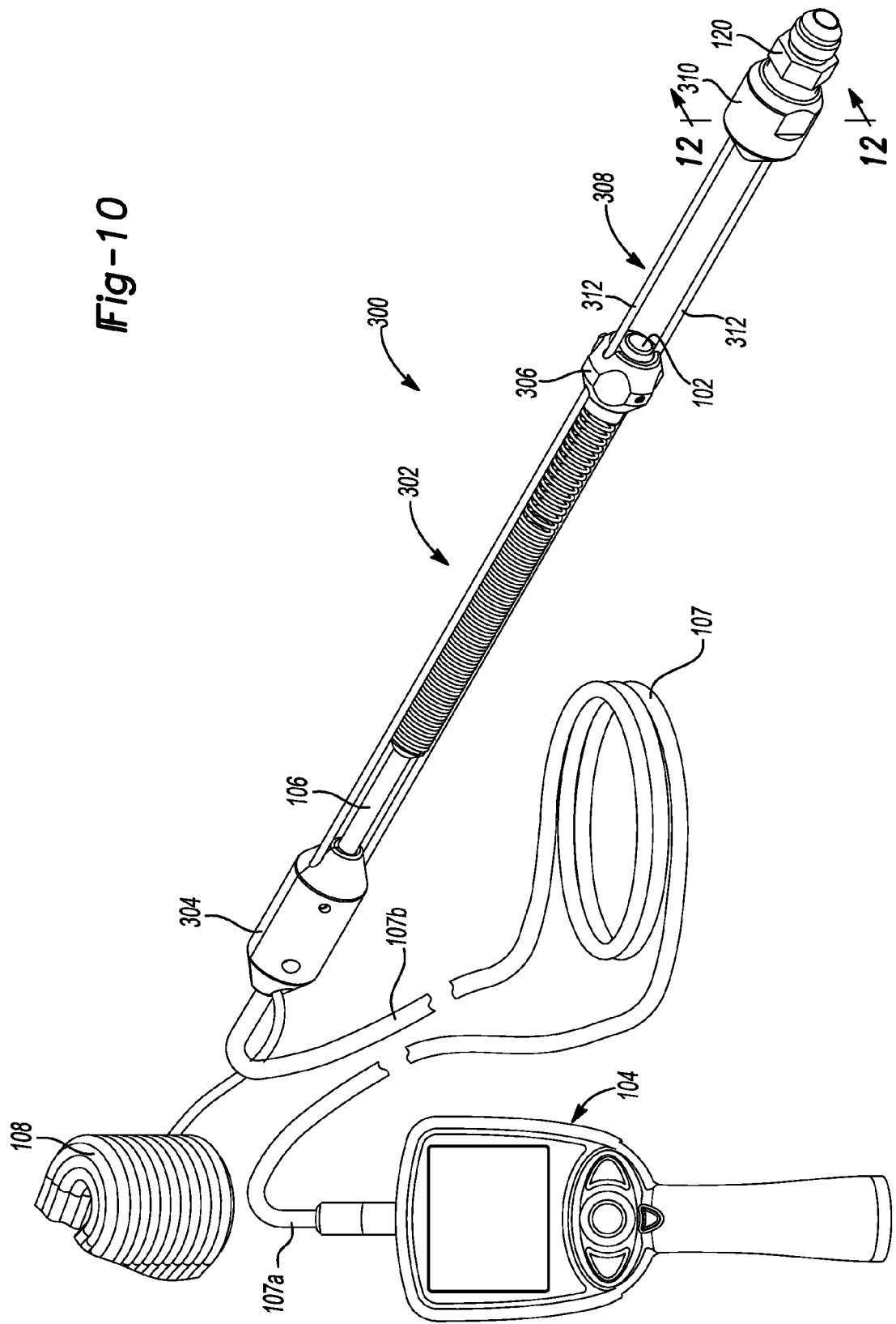

FIG. 10 shows a perspective view of a portion of an alternative embodiment of a visual inspection system according to the present disclosure, the inspection system including a camera rigging.

Figure 11:
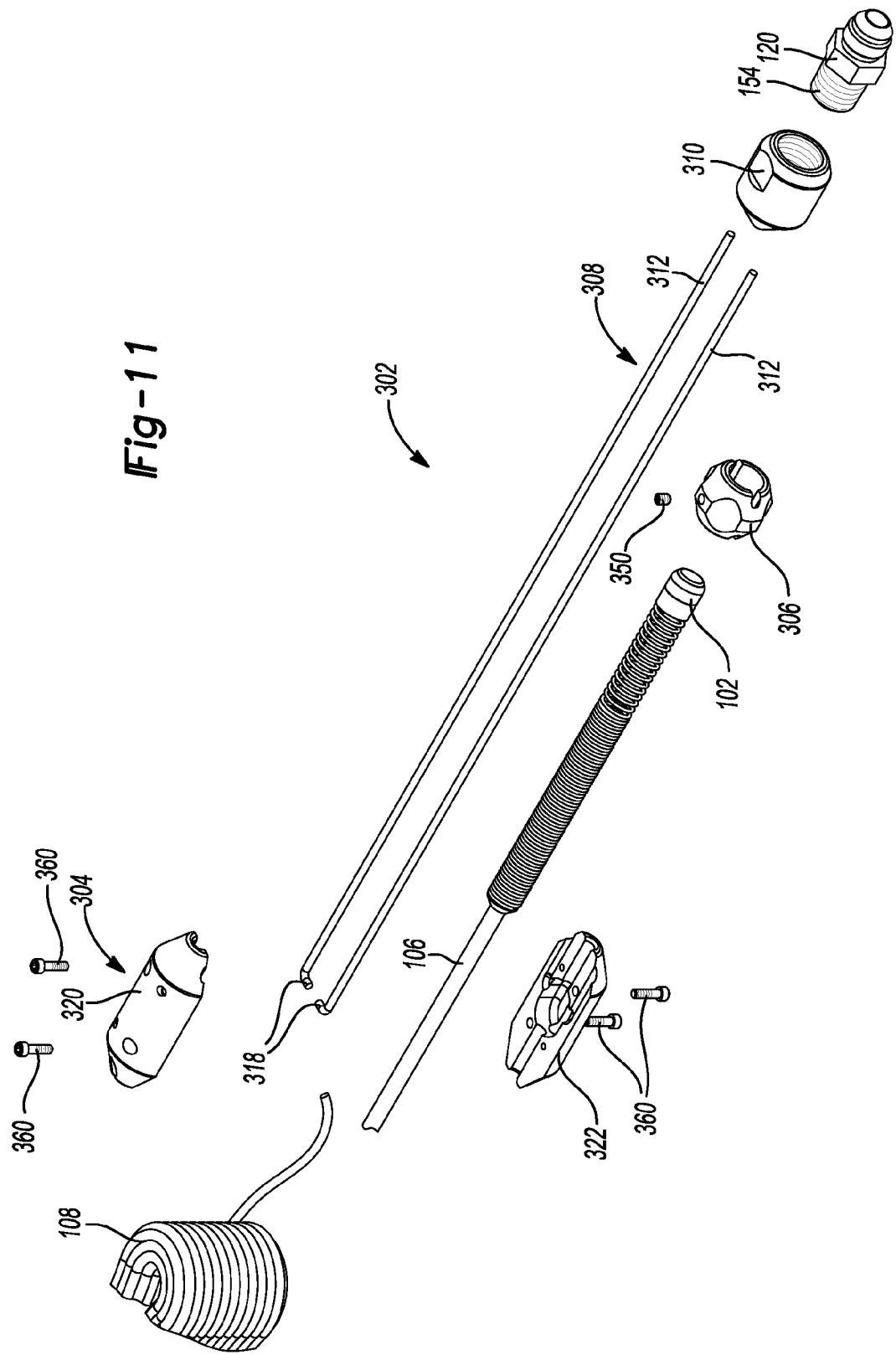

FIG. 11 is an exploded perspective view of the camera rigging of FIG. 10.

Figure 12:
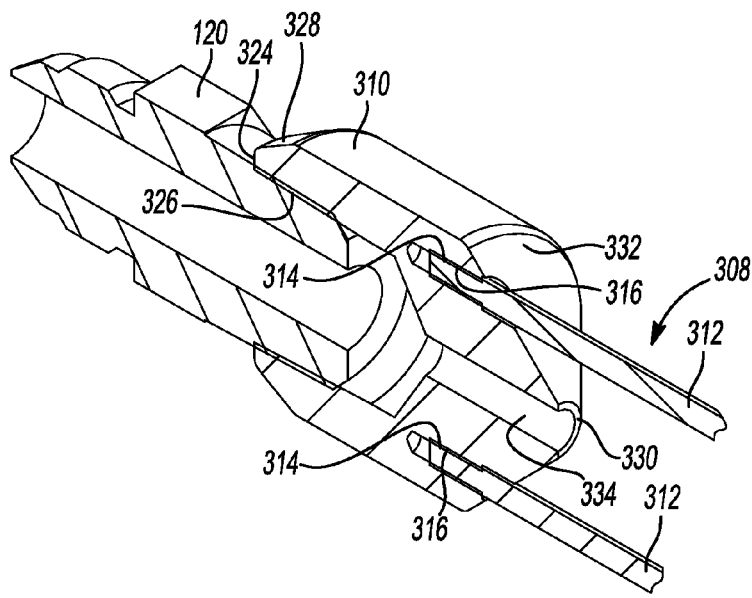

FIG. 12 illustrates a front perspective view in partial cross-section of a portion of the camera rigging of FIG. 10, including a connector fitting, and an adapter for coupling the connector fitting to an air supply hose.

Figure 13A:
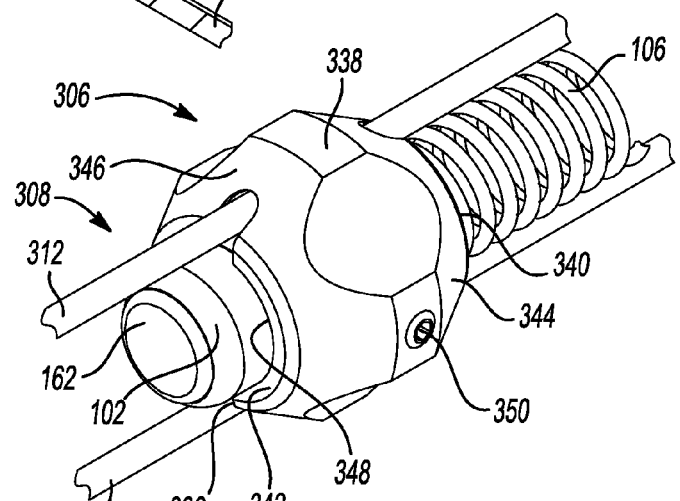
Figure 13B:
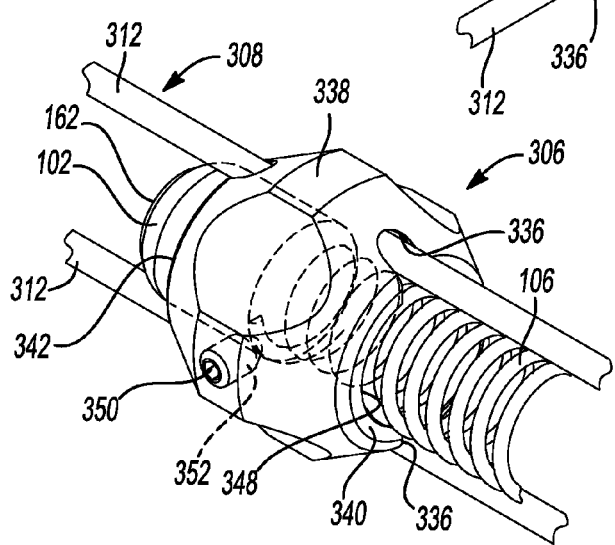

FIGS. 13A and 13B show front and rear perspective views, respectfully, of the camera rigging of FIG. 10, including a camera guide and a camera.

Figure 14:
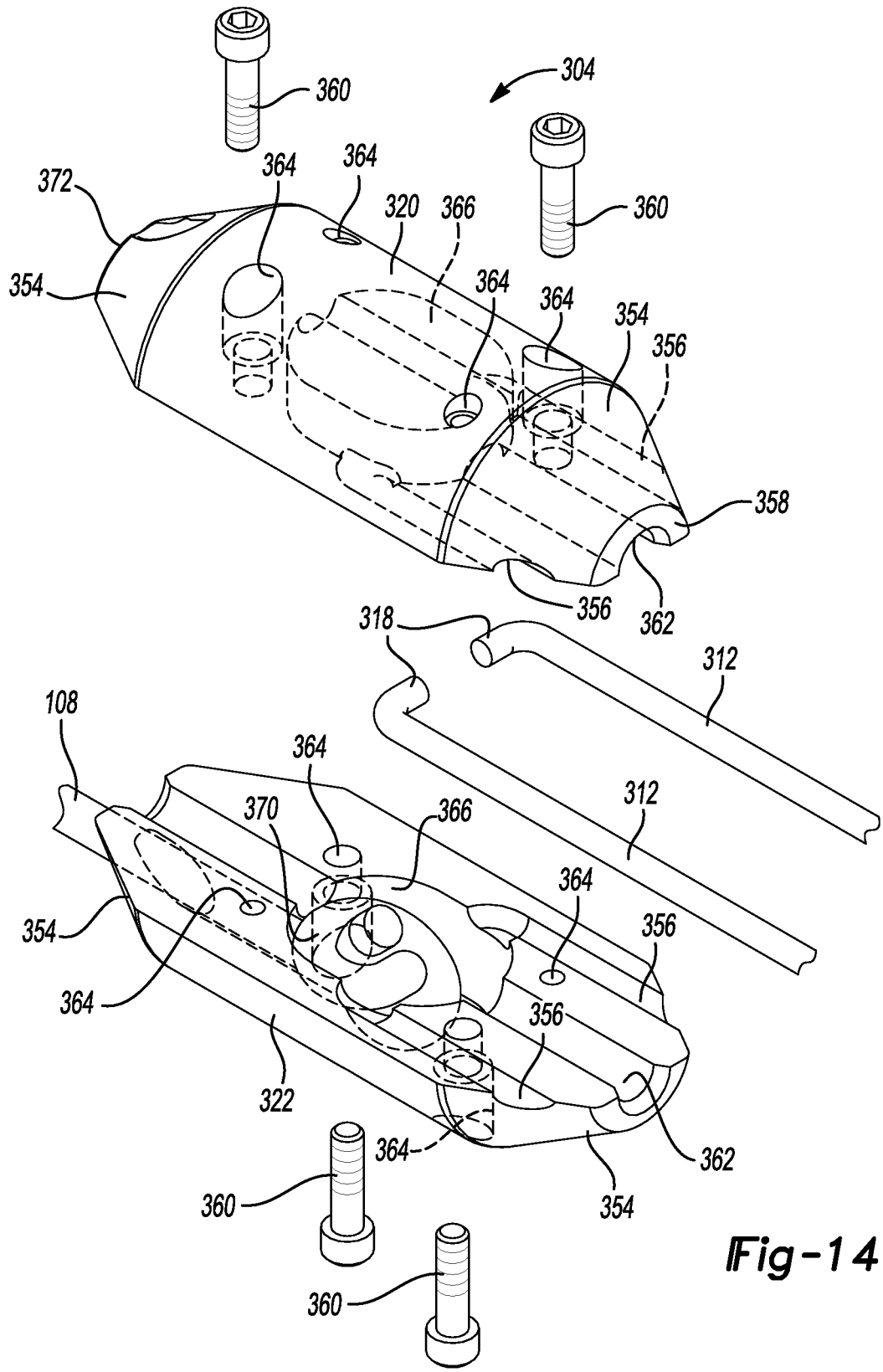

FIG. 14 is an exploded perspective view showing a portion of the camera rigging of FIG. 10, including a camera connector clamp.

Figure 15:
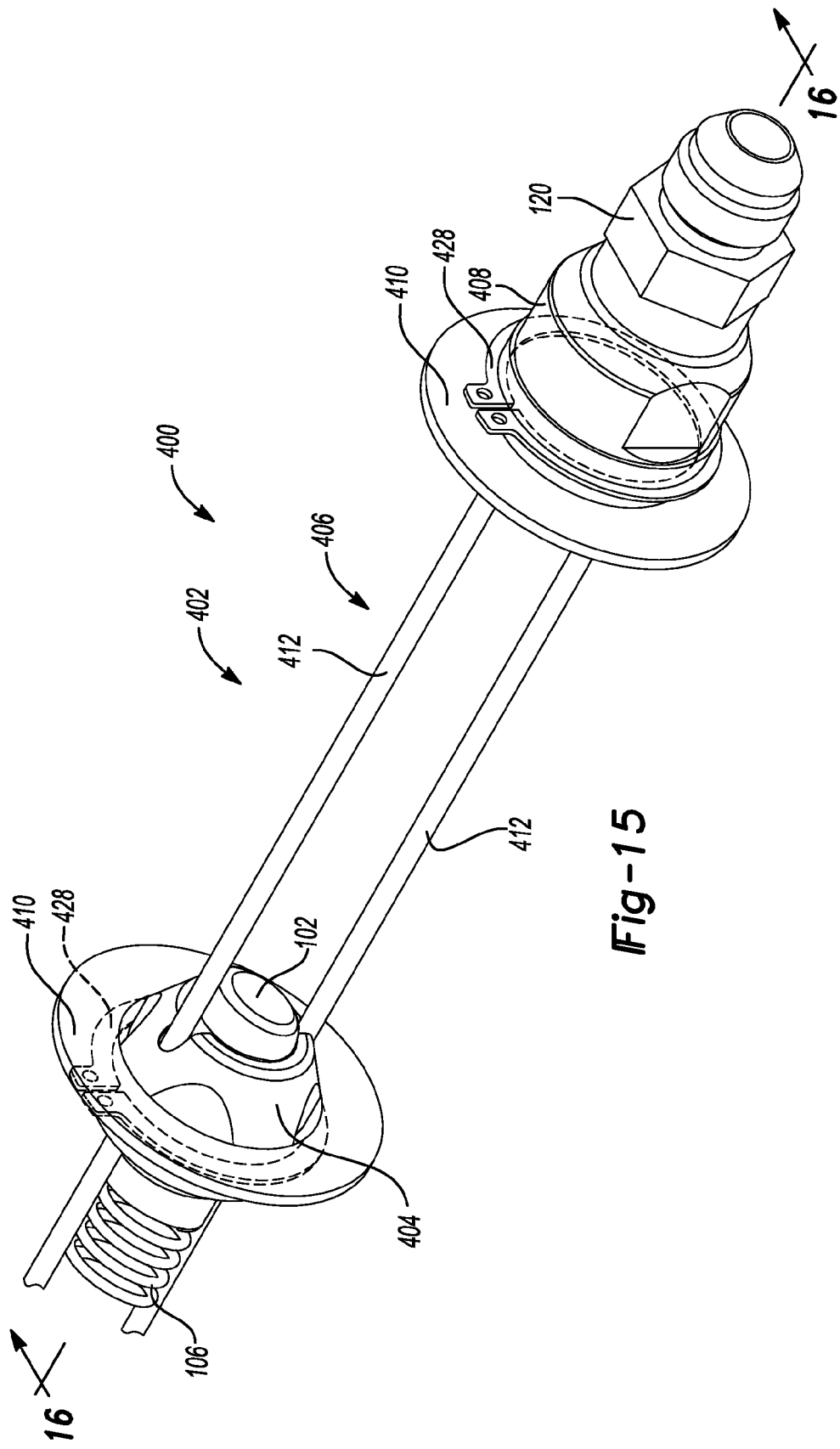

FIG. 15 is a perspective view of another alternative embodiment of a visual inspection system according to the present disclosure, the inspection system including a camera rigging having guide wipers.

FIG. 16 is a cross-sectional view of the camera rigging of FIG. 15 taken along a line 16-16 shown in FIG. 15.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. Example embodiments will now be described more fully with reference to the accompanying drawings.

An inspection system and method according to the present disclosure is broadly applicable for use in the underground utility construction industry, and particularly in underground boring operations used for installing underground utility lines.

The inspection system generally includes a sensor, a sensor carrier, and an output device. The sensor is employed to obtain inspection data regarding the condition of the tunnel created by the underground boring operation. Any of a variety of different sensor technologies could be employed in the inspection system, such as a camera that captures visible images of the tunnel, as well as passive sensors like touch sensors that can physically sense features of the tunnel, infrared sensors that can capture infrared images of the tunnel, or vapor sensors that can sense the presence of Volatile Organic Compounds (VOCs) or other gases in the tunnel, or active sensors like sonar, radar and lasers that can measure features of the tunnel.

The sensor carrier is adapted to incorporate the sensor and connect to means for transporting the sensor through the tunnel.

The output device receives an output signal from the sensor corresponding to the inspection data and presents it to an operator for interpretation and/or otherwise documents and/or creates a record of the inspection. In addition, the output device can include a user interface that enables an operator to add a user input to a record of the inspection, such as notes, commentary, or the like. The user input can take any of a variety of forms, including typewritten text, audio, time stamping or bookmarking, to name a few. Additionally, the output device can be configured to broadcast or post a record of the inspection so it is accessible to specified recipients, including to a database of the operator, to local municipalities, to regulatory agencies, to utility companies, to other contractors, and to property owners.

Figure 1A:
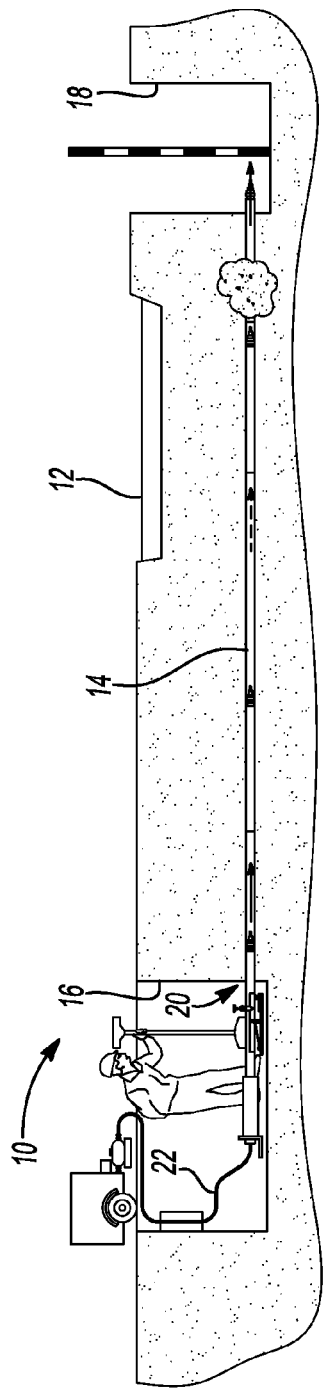
FIGS. 1A, 1B and 1C illustrate a conventional system and method for underground pneumatic boring.
Figure 1B:
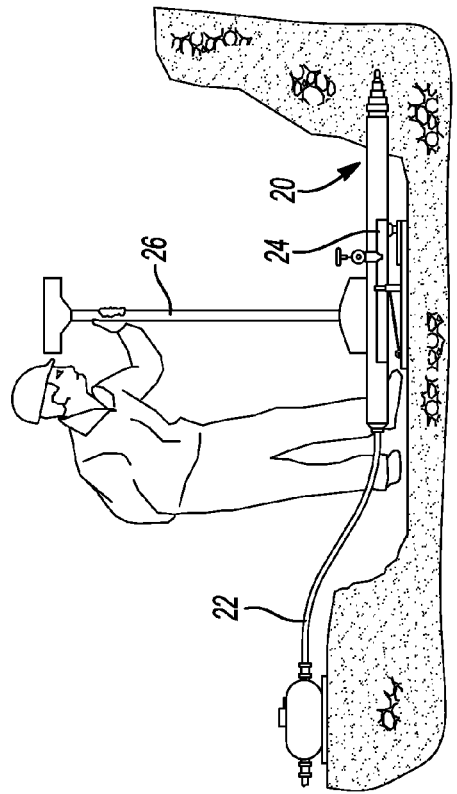
Figure 1C:
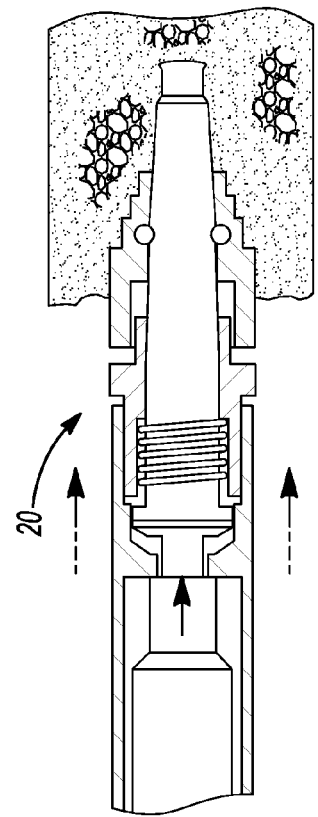
Figure 2:
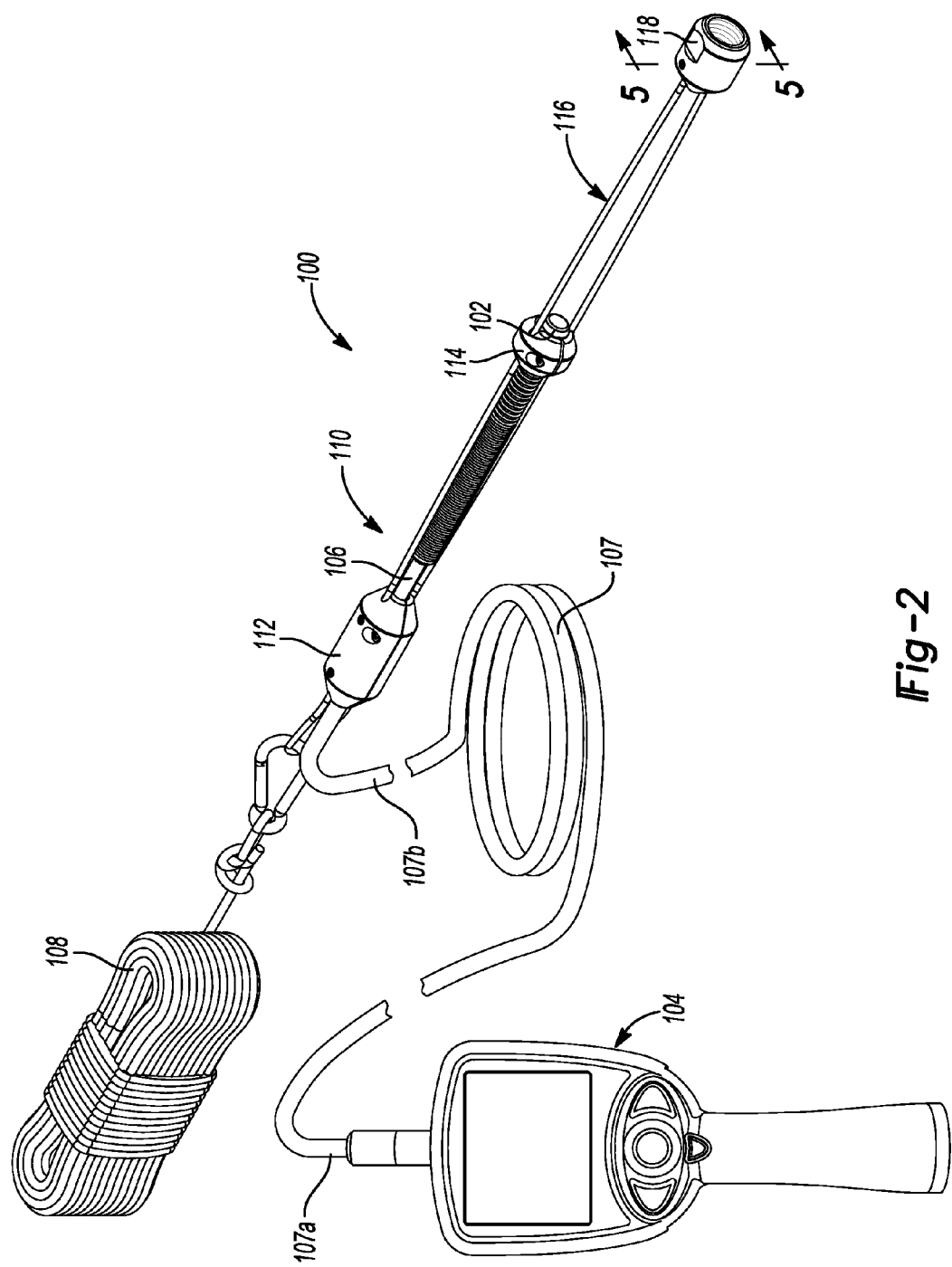
FIG. 2 is a perspective view of an inspection system according to the present disclosure, the inspection system including a camera rigging.
Figure 3:
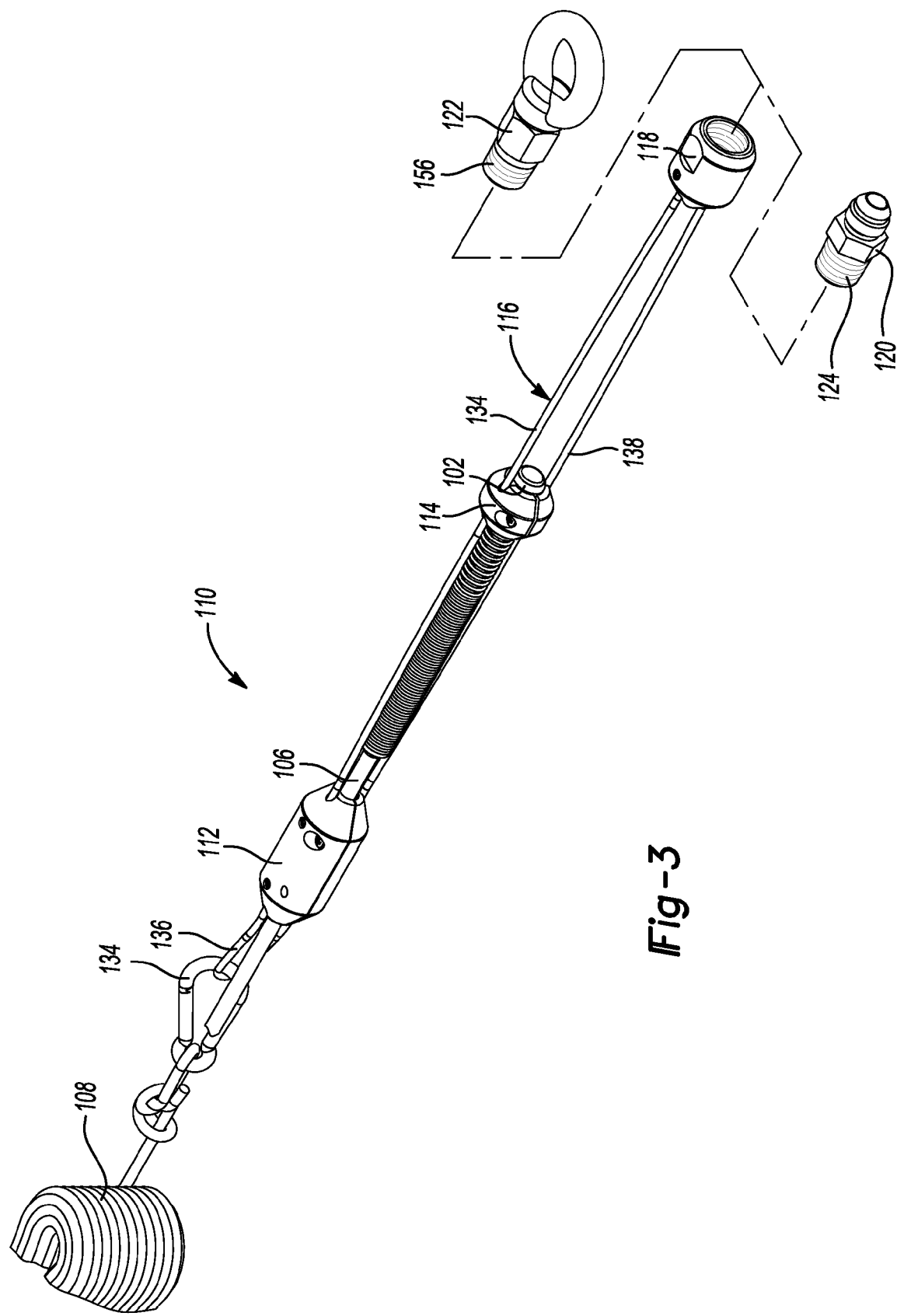
FIG. 3 shows a perspective view of the camera rigging of FIG. 2, including a connector fitting, and adapters for coupling the connector fitting to an air supply hose, a drill bit, and/or a utility line.
Figure 4:
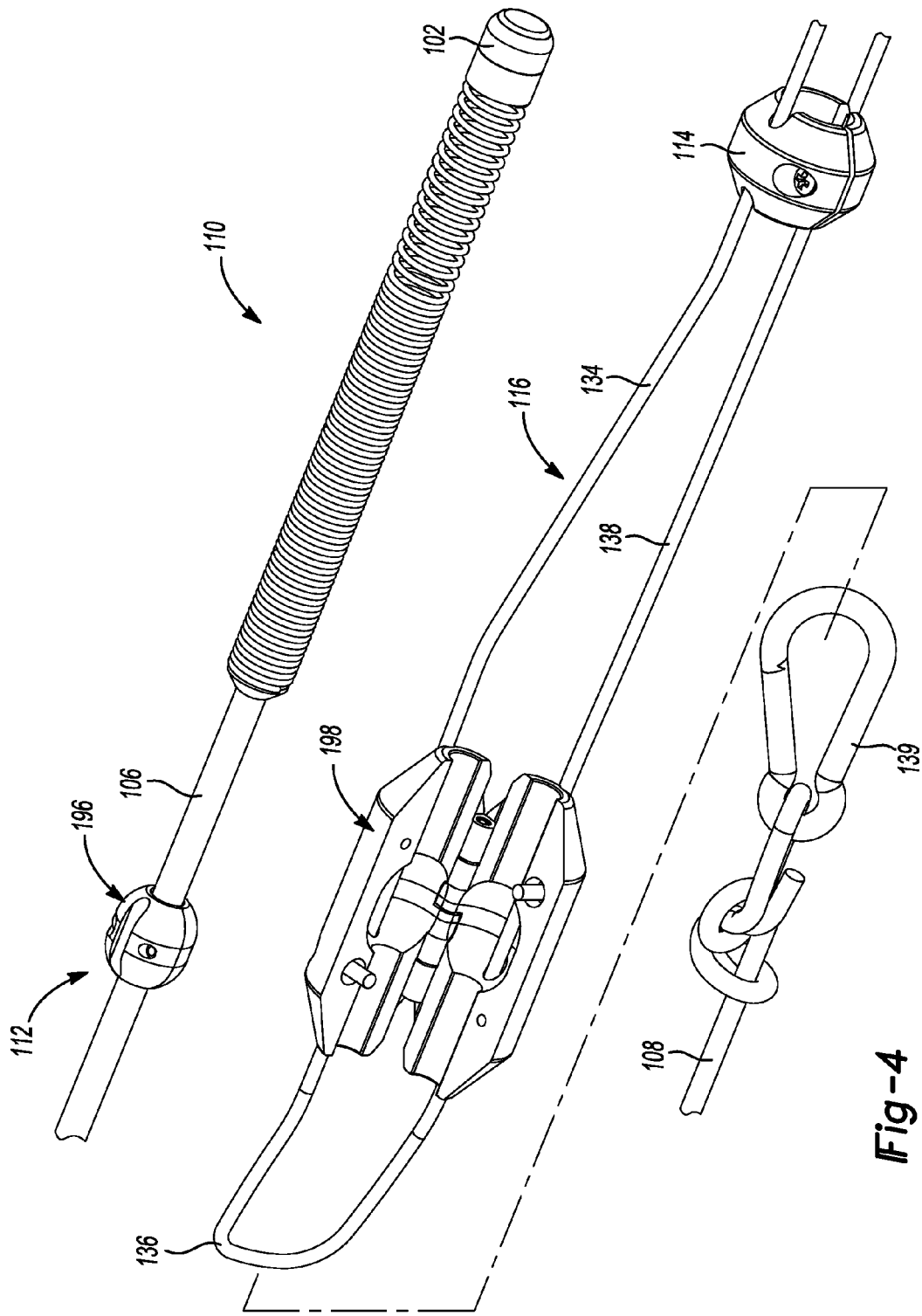
FIG. 4 is a partially exploded perspective view of a portion of the camera rigging of FIG. 2.

In one exemplary aspect of the disclosure a visual inspection system and method for its use in underground pneumatic boring to assist in preventing utility line crossbores is provided. Referring now to FIG. 2, a visual inspection system according to the present disclosure is generally indicated at 100. The visual inspection system 100 includes an inspection camera 102 that is configured for travel through a tunnel created in an underground pneumatic boring operation before a new utility line is run. As the camera 102 traverses through the tunnel, an operator can view a real-time image of the tunnel on a display device 104 and make a visual inspection of the tunnel to determine whether another already existing utility line, such as a sanitary sewer line, has been intersected during the boring operation. By doing so, the potential for crossbores is significantly reduced. A camera cable 106, also referred to as a push cable or a pushrod, connects the camera 102 to the display 104 via an interface cable 107. The interface cable has a first end 107a that connects to the display 104 and a second end 107b opposite form the first end 107a that connects to the camera cable 106 using, for example, a cable connector (not shown). The interface cable 107 can be mounted on a reel (not shown) to store the length of the interface cable 107 and adjust the amount of slack in the interface cable 107 as the camera 102 traverses through the tunnel.

A suitable inspection camera for use with a visual inspection system of the present disclosure is available from Ridge Tool Company of Elyria, Ohio, such as one of the SeeSnake® drain and sewer inspection camera and cable reels. The output from the camera can include still pictures and/or video. In addition, a suitable display device for viewing and/or recording the output from the camera is likewise available from Ridge Tool Company, such as the SeeSnake® monitors and recorders. Also, the lens of the camera can be varied to alter the viewing angle and/or field of view of the camera. For example, a "fish eye" lens may be incorporated so that the walls of a bore peripheral to the camera are captured within the camera's field of view. In addition, the inspection images can be recorded and/or otherwise saved to document the underground boring operation, that no crossbores were created, that no underground utilities were damaged, and/or that there were no other obstacles in the path of the tunnel.

The visual inspection system 100 further includes a tether 108 and a camera rigging 110 comprising a camera connector clamp 112, a camera guide 114, a frame 116 comprising a flexible member (e.g., wire, rope), and a connector fitting 118. The connector fitting 118 is configured to connect to a thread adapter 120 or an eye bolt 122, which can be included in the system 100. With brief reference to FIGS. 8B, 8C, 9B, and 9C, the connector fitting 118 adapts the system 100 for connection to, for example, a mating fitting 124 that correspondingly connects to an end of the air supply hose 22 (shown in FIG. 8B). In addition, the air supply hose 22 can be disconnected from the mating fitting 124, and a utility line 128 can be connected to the mating fitting 124 (shown in FIG. 8C). The connector fitting 118 adapts the system 100 for connection to, for example, a swivel coupling 130 that correspondingly connects to an end of a drill bit 132 for use in horizontal directional drilling (shown in FIG. 9B). Additionally, the drill bit 132 can be disconnected from the swivel coupling 130, and the utility line 128 can be connected to the swivel coupling 130 (shown in FIG. 9C).

With reference to FIGS. 3, 4, 5, 6A, 6B, 7A, 7B, and 7C, the features and construction of an exemplary embodiment of the camera rigging 110 can be understood. The camera rigging 110 comprises the frame 116, which has the camera connector clamp 112 attached at one end and the connector fitting 118 attached at the other end. The camera guide 114 is attached to the frame 116 and the camera 102 and located intermediate the opposite ends of the frame 116.

The frame 116 connects together components of the camera rigging 110, including the camera connector clamp 112, the camera guide 114, and the connector fitting 118, while separating the camera connector clamp 112 and the connector fitting 118 a fixed distance apart when, for example, the camera rigging 110 is pulled through a tunnel. The flexibility of the frame 116 enables the frame 116 to flex in response to curves or bends in a tunnel instead of breaking or permanently deforming. The frame 116 comprises a single flexible member that includes a first segment 134, a second segment 136, and a third segment 138. The first segment 134 extends from the connector fitting 118, through the camera guide 114 and the camera connector clamp 112, and to the second segment 136. The second segment 136 forms a loop that extends between and connects the first segment 134 and the third segment 138. The third segment 138 extends from the second segment 136, through the camera connector clamp 112 and the camera guide 114, and to the connector fitting 118.

The tether 108 can be releasably attached to the camera rigging 110 using a clip 139 (e.g., a carabiner, a spring snap, a snap hook) that clips onto the loop formed by the second segment 136 of the frame 116. Releasably attaching the tether 108 to the camera rigging 110 allows an operator to remove the tether 108 to make the camera rigging 110 easier to handle and allows the operator to replace the tether 108 with a different tether. The tether 108 comprises, for example, a flexible rope or cord that extends at least as long as a tunnel created during a boring operation, and is preferably longer. The tether 108 is used to pull the camera 102 and camera rigging 110, together with a new utility line, back through a tunnel after an inspection process has been completed.

Figure 5:
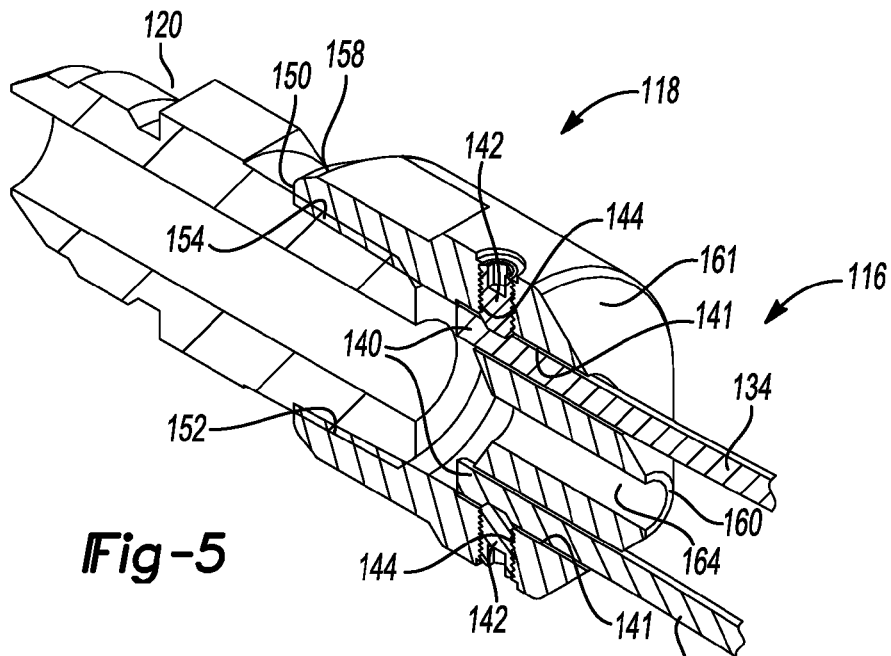
FIG. 5 illustrates a front perspective view in partial cross-section of a portion of the camera rigging of FIG. 2, including the connector fitting, and the adapter for coupling the connector fitting to an air supply hose.
Figure 7C:
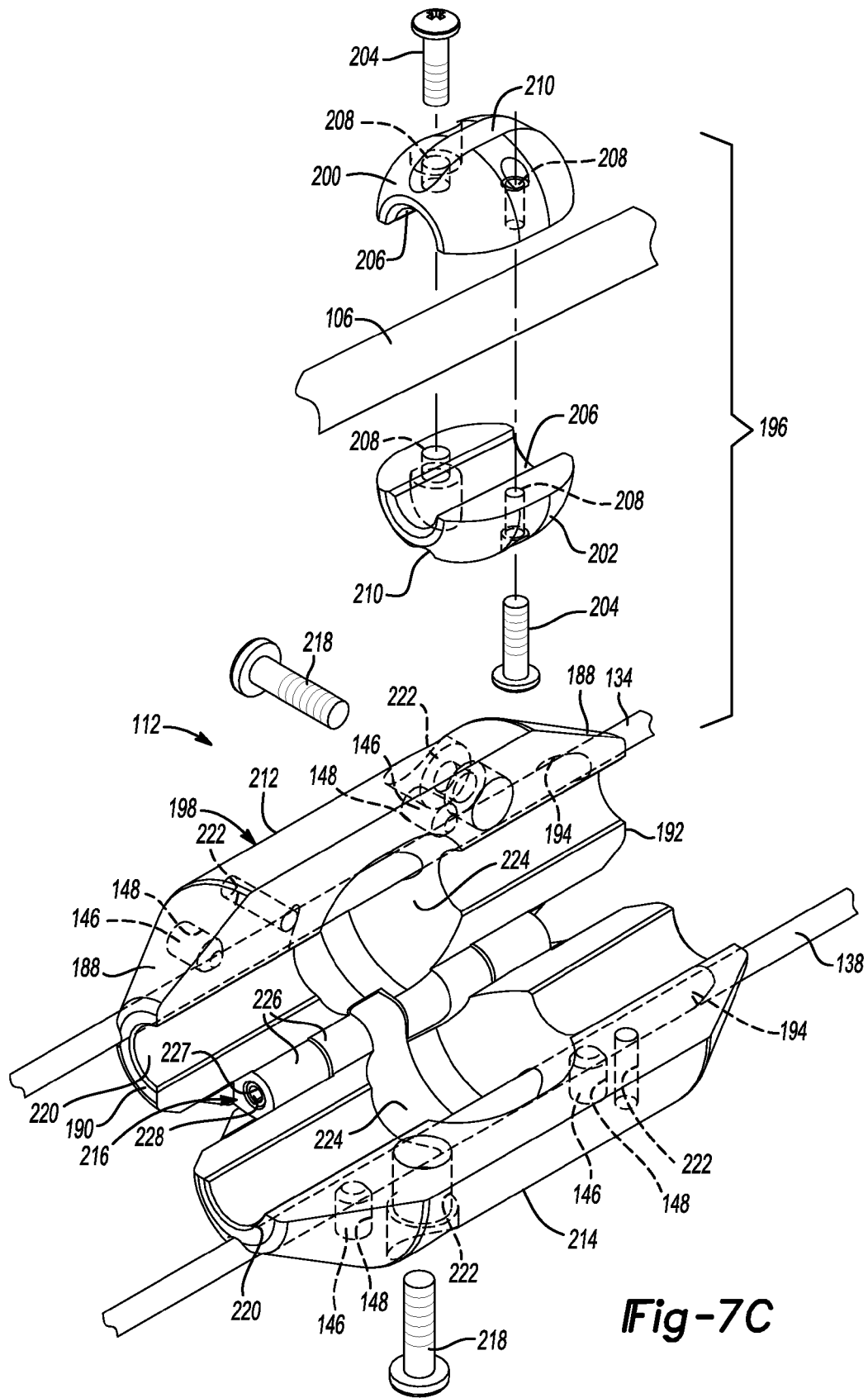
FIG. 7C shows a cross-sectional view of the camera connector clamp taken along a line 7C-7C shown in FIG. 7A.

As shown in FIG. 5, opposite ends 140 of the single flexible member forming the frame 116 extend into corresponding apertures 141 in the connector fitting 118 and are secured to the connector fitting 118 such as by set screws 142 that engage corresponding female threads 144 formed in the connector fitting 118. As shown in FIGS. 7A, 7B, and 7C, the segments 134, 138 of the frame 116 are secured to the camera connector clamp 112 such as by set screws 146 that engage corresponding female threads 148 formed in the camera connector clamp 112. It should be appreciated that although the frame in this embodiment includes a single flexible member, the frame can include multiple flexible members and/or one or more rigid members (e.g., rods).

FIG. 5 shows an enlarged view of the connector fitting 118. The connector fitting 118 is a generally cylindrically shaped component having a diameter that is at least equal to, and preferably just slightly greater than, the diameter of the air supply hose 22. On a first end 150, the connector fitting 118 includes a connection portion 152 that is threaded for engagement with a threaded portion 154 on the thread adapter 120 or a threaded portion 156 on the eye bolt 122 (shown in FIG. 3), enabling the camera rigging 110 to be easily attached to and detached from the air supply hose 22, the utility line 128, and the drill bit 132. Alternatively, the connection portion 152 can incorporate a quick-connect device that engages a corresponding quick-connect device on the air supply hose 22, the utility line 128, and/or the drill bit 132. An outer surface 158 of the connector fitting 118 at the first end 150 is rounded over or tapered to a slightly reduced diameter. This feature is included in order to minimize the potential for "snow plowing," i.e., scraping the walls of a bore and creating a buildup of soil, as the visual inspection system is pulled through the tunnel during an inspection step.

On a second end 160 of the connector fitting 118 opposite to the connection portion 152 is included a tapered cone portion 161. The cone portion 161 is centered in the frame 116 and is located directly in front of the camera 102. The outer surface of the cone portion 161 is reflective, and the angle of the taper of the cone portion 161 enables a peripheral vision inspection of the walls of a bore relative to the axis of the camera 102. As such, an operator can easily inspect the walls of a bore that may otherwise be outside the field of view of a camera lens 162 (shown in FIGS. 6A and 6B) because the images appear within the view of the camera lens 162 as a reflection on the cone portion 161 of the connector fitting 118. The cone portion 161 also minimizes the potential for snow plowing when the camera rigging 110 is pulled back through a tunnel while carrying a new utility line. Additionally included in the connector fitting 118 is a passageway 164 that extends through the component from the connection portion 152 to the cone portion 161. When the camera rigging 110 is connected to the air supply hose 22, the passageway 164 enables bursts of compressed air to be shot through the connector fitting 118 in order to remove any buildup of soil or debris that may lodge on the camera 102 during the inspection process, or to clear a localized collapse of a tunnel, should that occur.

Figure 6A:
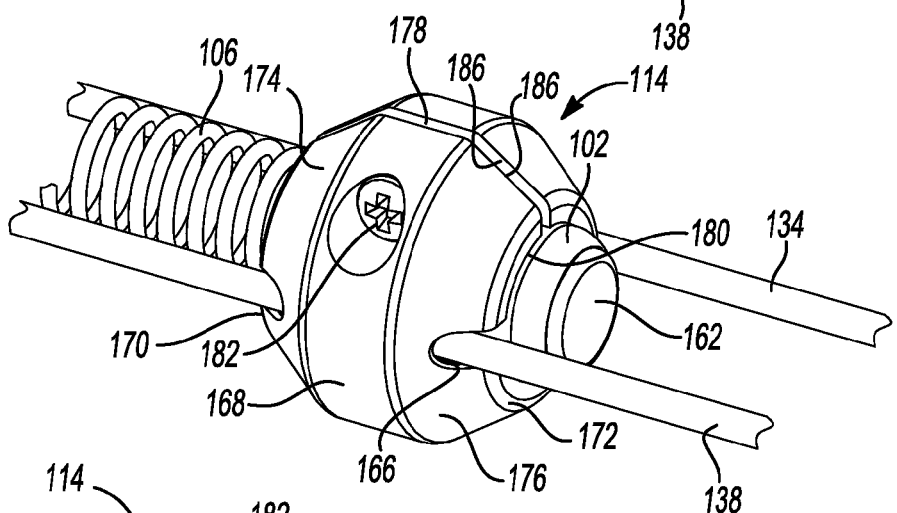
FIGS. 6A and 6B show front and rear perspective views, respectfully, of the camera rigging of FIG. 2, including a camera guide and a camera.
Figure 6B:
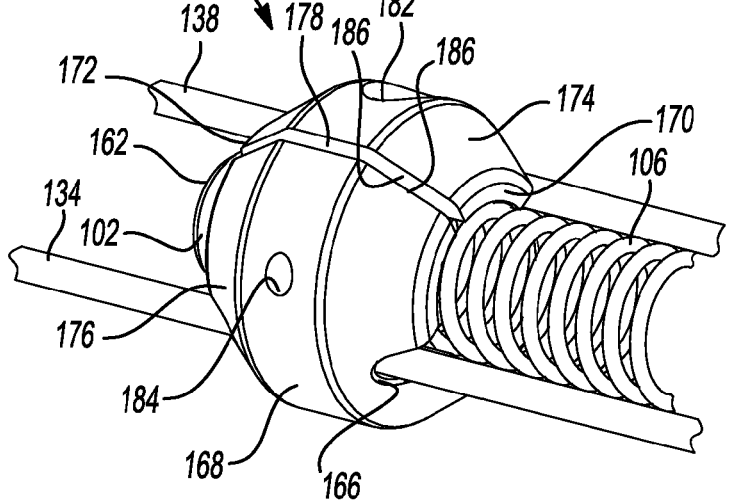

FIGS. 6A and 6B show enlarged views of the camera guide 114. The camera guide 114 is received within the frame 116, with the segments 134, 138 of the frame 116 passing through corresponding apertures 166 through the camera guide 114. The camera guide 114, in turn, receives the camera 102 and serves to orient and align the camera 102 within the frame 116. In addition, the camera guide 114 prevents the camera 102 from dragging along a tunnel surface which, in turn, helps prevent dirt and/or debris from building up on the camera lens 162. Preferably, the camera 102 is centered within the camera guide 114 for optimal positioning for viewing the walls of a bore while conducting an inspection.

The camera guide 114 can be fixed in its position intermediate the connector fitting 118 and the camera connector clamp 112. Alternatively, the position of the camera guide 114 can be adjusted such as by sliding it back and forth along the segments 134, 138 of the frame 116. In FIGS. 6A and 6B, the camera guide 114 is shown to be generally cylindrical with a maximum outer diameter at its midpoint 168, and tapering inwardly from the midpoint 168 to a smaller diameter at its opposite ends 170, 172. The maximum outer diameter of the camera guide 114 is approximately the same as the maximum outer diameter of the connector fitting 118. The tapered shape of exterior surfaces 174, 176 of the camera guide 114 enables it to move within a tunnel in either direction while limiting the potential for snow-plowing. The shape of the camera guide 114 helps maintain the integrity of a bore, especially around the camera 102, during the inspection process.

The camera guide 114 has a unitary body with a longitudinal slit 178 extending radially through a portion of the camera guide 114, and an aperture 180 extending longitudinally through the center of the camera guide 114 and receiving the camera 102. The camera 102 is secured to the camera guide 114 using a fastener such as a screw 182 that engages corresponding female threads disposed in an aperture 184 extending through the camera guide 114 perpendicular to the slit 178. Since the slit 178 does not extend radially through the entire camera guide 114 to divide the camera guide 114 into two halves, only one screw is required to clamp the camera guide 114 onto the camera 102. The inner diameter of the camera guide 114 can be slightly greater than the outer diameter of the camera 102 so that the camera guide 114 can be easily slid over the camera 102. A gap exists between opposite edges 186 of the slit 178. Consequently, tightening the screw 182 into the aperture 184 narrows the width of the slit 178 and causes the camera guide 114 to clamp onto the camera 102. Securing the camera 102 in this manner prevents damage to the camera 102.

Turning to FIGS. 7A, 7B, and 7C, enlarged views of the camera connector clamp 112 are shown. When closed, the camera connector clamp 112 has a generally cylindrical shape with a tapering conical portion 188 located at each of its opposite ends 190, 192. The camera connector clamp 112 has a maximum outer diameter that is approximately the same as the maximum outer diameter of the connector fitting 118. The tapering conical portions 188 of the camera connector clamp 112 enable it to move within a tunnel in either direction while limiting the potential for snow-plowing. The camera connector clamp 112 includes a plurality of apertures 194 extending through the camera connector clamp 112 that each receives corresponding ones of the segments 134, 138 of the frame 116. As previously discussed, the segments 134, 138 of the frame 116 are secured to the camera connector clamp 112 such as by the set screws 146, which engage the female threads 148 in the camera connector clamp 112.

As shown in FIGS. 7B and 7C, the camera connector clamp 112 includes an inner bulb 196 and an outer shell 198. The inner bulb 196 and the outer shell 198 can be formed (e.g., machined or injection molded) from plastic or metal (e.g., stainless steel). The inner bulb 196 clamps onto the camera cable 106 and the outer shell 198 clamps onto the inner bulb 196 to secure the camera cable 106 to the camera connector clamp 112. The inner bulb 196 includes a pair of hemispherical body members 200, 202 that are joined together using fasteners such as screws 204. The body members 200, 202 have U-shaped grooves 206 extending longitudinally through the center thereof to accommodate the camera cable 106, and apertures 208 disposed on opposite sides of the grooves 206, some of which are threaded for engagement with the screws 204. The body members 200, 202 also have U-shaped grooves 210 extending longitudinally through an outer radius thereof to accommodate the segments 134, 138 of the frame 116.

The outer shell 198 includes a pair of half-cylinder body members 212, 214 that pivot relative to each other about a hinge 216 and are joined together using fasteners such as screws 218. The body members 212, 214 have U-shaped grooves 220 extending longitudinally through the center thereof to accommodate the camera cable 106, as well as apertures 222 disposed on opposite sides of the grooves 220, some of which are threaded for engagement with the screws 218. The body members 212, 214 also have hemispherical pockets 224 bisecting the grooves 220 to accommodate the hemispherical body members 200, 202. The body members 212, 214 of the outer shell 198 include brackets 226 defining apertures 227 that receive a pin 228 to form the hinge 216. One end of the pin 228 can be knurled and the remainder of the pin 228 can be relatively smooth. The smooth portion of the pin 228 can be inserted into the apertures 227 first, yielding a slip fit between the smooth portion of the pin 228 and the inner surface of the apertures 227. Then, after the smooth portion of the pin 228 is inserted into the apertures 227, the knurled end engages the inner surfaces of the apertures 227 to yield a press fit that retains the pin 228 in the apertures 227.

The outer shell 198 is secured to the inner bulb 196 using the screws 218, which engage corresponding female threads disposed in the apertures 222 formed in the outer shell 198. When the outer shell 198 is closed as shown in FIGS. 7A and 7B, the pockets 224 form a single pocket having an inner diameter that is greater than the outer diameter of the inner bulb 196. A gap 230 exists between opposite edges 232 of the body members 212, 214. Consequently, tightening the screws 218 into the apertures 222 narrows the width of the gap 230 and clamps the outer shell 198 onto the inner bulb 196, which in turn causes the inner bulb 196 to clamp onto the camera cable 106. Additionally, the engagement between the segments 134, 138 of the frame 116 and the corresponding apertures 194 in the camera connector clamp 112 prevent the camera 102 from rotating around the camera cable 106.

FIGS. 8A, 8B, and 8C illustrate an exemplary method for using a visual inspection system according to the present disclosure. As shown in FIG. 8A, the boring tool 20 first creates the tunnel 14 for the new utility line 128 using the well-known underground pneumatic boring technique. After the tunnel 14 has been created, the boring tool 20 extends from the tunnel 14 into the exit pit 18, and the air supply hose 22 remains in the tunnel. As shown in FIG. 8B, the boring tool 20 is removed from the air supply hose 22, and then the camera rigging 110, with the camera 102 secured thereto, is attached to the air supply hose 22 by way of the thread adapter 120. The air supply hose 22 is then pulled back through the tunnel 14, bringing the camera rigging 110 and the camera 102 with it as it is reeled in. The air supply hose 22 is reeled-in at a pace that enables an operator of the system 100 to inspect the bore by viewing the output from the camera 102 on the display device 104. In doing so, the operator can determine whether the boring tool 20 has bored through existing underground utility lines, such as a sanitary sewer line, and created the potential for a crossbore. After the air supply hose 22 has been retrieved, and the camera 102 has passed through the entire length of the tunnel 14, the air supply hose 22 is disconnected from the thread adapter 120. If the operator determines that there is no crossbore potential, the mating fitting 124 engaged with the new utility line 128 is attached to the thread adapter 120, as shown in FIG. 8C. Finally, the tether 108 is used to pull the camera rigging 110 and the attached utility line 128 back through the tunnel 14 to effect installation of the new utility line 128.

FIGS. 9A, 9B, and 9C illustrate another exemplary method for using a visual inspection system according to the present disclosure. As shown in FIG. 9A, the boring tool 20 first creates the tunnel 14 for the new utility line 128 using a well-known horizontal directional drilling technique. For example, a drill (not shown) can rotate the drill bit 132 using drill pipes 234, and additional ones of the drill pipes 234 can be added as the drill bit 132 proceeds to cut the tunnel 14. After the tunnel 14 has been created, the drill bit 132 extends from the tunnel 14 into the exit pit 18, and the drill pipes 234 remain in the tunnel. As shown in FIG. 9B, the camera rigging 110, with the camera 102 secured thereto, is then attached to the drill bit 132 by way of the eye bolt 122 and the swivel coupling 130. The drill pipes 234 are then pulled back through the tunnel 14, bringing the drill bit 132, the camera rigging 110, and the camera 102 with them as they are pulled in. The drill pipes 234 are pulled back at a pace that enables an operator of the system 100 to inspect the bore by viewing the output from the camera 102 on the display device 104. In doing so, the operator can determine whether the drill bit 132 has bored through existing underground utility lines, creating the potential for a crossbore. After the drill pipes 234 have been retrieved, and the camera 102 has passed through the entire length of the tunnel 14, the drill bit 132 is disconnected from the swivel coupling 130. If the operator determines that there is no crossbore potential, the new utility line 128 is attached to the swivel coupling 130, as shown in FIG. 9C. Finally, the tether 108 is used to pull the camera rigging 110 and the attached utility line 128 back through the tunnel 14 to effect installation of the new utility line 128.

Referring now to FIG. 10, an alternative embodiment of a visual inspection system according to the present disclosure is generally indicated at 300. The visual inspection system 300 includes the camera 102, the display device 104, the camera cable 106, the tether 108, and a camera rigging 302 including a camera connector clamp 304, a camera guide 306, a frame 308, and a connector fitting 310. The connector fitting 310 is configured to connect to the thread adapter 120 (as shown) or the eye bolt 122 (shown in FIG. 2), which can be included in the system 300. The connector fitting 310 adapts the system 300 for connection to, for example, the air supply hose 22, the utility line 128, and/or the drill bit 132 (shown in FIGS. 8A, 8B, 8C, 9A, 9B, and 9C).

The camera connector clamp 304 is attached to one end of the frame 308 and the connector fitting 310 is attached to the other end thereof. The camera guide 306 is attached to the frame 308 and located intermediate the opposite ends of the frame 308. The frame 308 separates the camera connector clamp 304 and the connector fitting 310 a fixed distance apart. The frame 308 comprises a plurality of straight, rigid rod members 312. As shown in FIG. 12, the rod members 312 are secured to the connector fitting 310 such as by male threads 314 formed at the ends of the rod members 312 that engage corresponding female threads 316 formed in the connector fitting 310. As shown in FIGS. 11 and 14, the opposite ends of the rod members 312 include L-shaped portions 318 that retain the rod members 312 within the camera connector clamp 304, the ends of the rod members 312 being sandwiched between a pair of body members 320, 322 included in the camera connector clamp 304.

FIG. 12 shows an enlarged view of the connector fitting 310. The connector fitting 310 is a generally cylindrically shaped component having a diameter that is at least equal to, and preferably just slightly greater than, the diameter of the air supply hose 22. On a first end 324, the connector fitting 310 includes a connection portion 326 that is threaded for engagement with the threaded portion 154 on the thread adapter 120 or the threaded portion 156 on the eye bolt 122 (shown in FIG. 3), enabling the camera rigging 302 to be easily attached to and detached from the air supply hose 22, the utility line 128, and the drill bit 132. Alternatively, the connection portion 326 can incorporate a quick-connect device that engages a corresponding quick-connect device on the air supply hose 22, the utility line 128, and/or the drill bit 132. An outer surface 328 of the connector fitting 310 at the first end 324 is rounded over or tapered to a slightly reduced diameter to minimize the potential for snow plowing.

On a second end 330 of the connector fitting 310 opposite to the connection portion 326 is included a tapered cone portion 332. The cone portion 332 is centered in the frame 308 and is located directly in front of the camera 102. The outer surface of the cone portion 332 is reflective, and the angle of the taper of the cone portion 332 enables a peripheral vision inspection of the walls of a bore relative to the axis of the camera 102. As such, an operator can easily inspect the walls of a bore that may otherwise be outside the field of view of the camera lens 162 (shown in FIGS. 13A and 13B) because the images appear within the view of the camera lens 162 as a reflection on the cone portion 332 of the connector fitting 310. The cone portion 332 also minimizes the potential for snow plowing when the camera rigging 302 is pulled back through a tunnel while carrying a new utility line. Additionally included in the connector fitting 310 is a passageway 334 that extends through the component from the connection portion 326 to the cone portion 332. When the camera rigging 302 is connected to the air supply hose 22, the passageway 334 enables bursts of compressed air to be shot through the connector fitting 310 in order to remove any buildup of soil or debris that may lodge on the camera 102 during the inspection process, or to clear a localized collapse of a tunnel, should that occur.

FIGS. 13A and 13B show enlarged views of the camera guide 306. The camera guide 306 is received within the frame 308, with the rod members 312 passing through corresponding apertures 336 through the camera guide 306. The camera guide 306, in turn, receives the camera 102 and serves to orient and align the camera 102 within the frame 308. In addition, the camera guide 306 prevents the camera 102 from dragging along a tunnel surface which, in turn, helps prevent dirt and/or debris from building up on the camera lens 162. Preferably, the camera 102 is centered within the camera guide 306 for optimal positioning for viewing the walls of a bore while conducting the inspection. The camera guide 306 can be fixed in its position intermediate the connector fitting 310 and the camera connector clamp 304. Alternatively, the position of the camera guide 306 can be adjusted such as by sliding it back and forth along the rod members 312. In FIGS. 13A and 13B the camera guide 306 is shown to be generally cylindrical at a maximum outer diameter in its midpoint 338, and tapering inwardly from the midpoint 338 to a smaller diameter at its opposite ends 340, 342. The maximum outer diameter of the camera guide 306 is approximately the same as the maximum outer diameter of the connector fitting 310. The tapered shape of exterior surfaces 344, 346 of the camera guide 306 enables it to move within a tunnel in either direction while limiting the potential for snow-plowing. The shape of the camera guide 306 helps maintain the integrity of a bore, especially around the camera 102, during the inspection process.

The camera guide 306 has a unitary body with an aperture 348 extending longitudinally through the camera guide 306 and receiving the camera 102. The camera 102 is secured to the camera guide 306 using a fastener such as a set screw 350 that engages corresponding female threads disposed in an aperture 352 formed in the camera guide 306.

Turning to FIG. 14, an enlarged view of the camera connector clamp 304 is shown. As discussed above, the camera connector clamp 304 includes the body members 320, 322, which sandwich the L-shaped portions 318 of the rod members 312 to retain them within the camera connector clamp 304. When assembled, the camera connector clamp 304 has a generally cylindrical shape with a tapering conical portion 354 located at each of its opposite ends. The camera connector clamp 304 has a maximum outer diameter that is approximately the same as the maximum outer diameter of the connector fitting 310. The conical portions 354 of the camera connector clamp 304 enable it to move within a tunnel in either direction while limiting the potential for snow-plowing. A pair of grooves 356 extend through each of the body members 320, 322 at a first end 358 of the clamp 304 to accommodate of the rod members 312.

The body members 320, 322 are joined together using fasteners such as screws 360. The body members 320, 322 have U-shaped grooves 362 extending longitudinally through the center thereof to accommodate the camera cable 106. In addition, the body members 320, 322 include apertures 364 disposed on opposite sides of the grooves 362, some of the apertures 364 being threaded for engagement with the screws 360. The body members 320, 322 also have hemispherical pockets 366 bisecting the grooves 362. The tether 108 is secured to the clamp 304 in an interior space thereof formed by the hemispherical pockets 366. For example, a knot 368 can be tied in the tether 108 to retain the tether 108 within the interior space. The tether 108 passes through an aperture 370 that extends between the interior space and a second end 372 of the clamp 304 that is opposite from the first end 358.

Referring now to FIGS. 15 and 16, another alternative embodiment of a video inspection system according to the present disclosure is generally indicated at 400. The video inspection system 400 includes the camera 102, the camera cable 106, and a camera rigging 402 including a camera guide 404, a frame 406, a connector fitting 408, and a pair of guide wipers 410. The connector fitting 408 is configured to connect to the thread adapter 120 (as shown) or the eye bolt 122 (shown in FIG. 3), both of which can be included in the system 400. The connector fitting 408 adapts the system 400 for connection to, for example, the air supply hose 22, the utility line 128, and/or the drill bit 132 (shown in FIGS. 8A, 8B, 8C, 9A, 9B, and 9C).

The frame 406 comprises one or more elongated members 412. The frame 406 maintains the camera guide 404 and the connector fitting 408 a fixed distance apart when, for example, the camera rigging 402 is pulled through a bore 414 (shown in FIG. 16). The connector fitting 408 is secured to the frame 406 by, for example, a press fit between the elongated members 412 of the frame 406 and apertures 416 formed in the connector fitting 408 that receive the elongated members 412. The elongated members 412 of the frame 406 extend longitudinally through apertures 418 formed in the camera guide 404. The camera guide 404 positions the camera 102 relative to the frame 406.

The guide wipers 410 protect the camera lens 162 from dirt or debris as the camera rigging 402 is pulled through the bore 414. The guide wipers 410 accomplish this by engaging the walls of the bore 414 to form a seal therebetween. The guide wipers 410 can be formed from flexible material (e.g., rubber, plastic). The engagement between the guide wipers 410 and the walls of the bore 414 causes the guide wipers 410 to flex as indicated at 420 and 422 when the camera rigging 402 is pulled in the direction of arrows 424 and 426, respectively. One of the guide wipers 410 is secured to the camera guide 404 and the other one of the guide wipers 410 is secured to the connector fitting 408. The guide wipers 410 can be secured to the camera guide 404 and the connector fitting 408 using, for example, split retaining rings 428. The camera guide 404 and the connector fitting 408 can each include a groove 430 that receives an inner edge of a corresponding one of the retaining rings 428 and a clamped portion of a flange 432 on a corresponding one of the guide wipers 410.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A visual inspection system for use in an underground boring operation comprising:
    a camera;
    a display;
    a cable connecting the camera to the display; and
    a camera rigging adapted to travel through a tunnel created in the underground boring operation, the camera rigging having a first end and a second end opposite from the first end, the camera rigging comprising:
        a frame comprising at least one elongated member;
        a camera connector clamp disposed at or adjacent to the first end of the camera rigging and adapting the camera rigging to clamp onto the cable;
        a camera guide disposed at a location between the first and second ends of the camera rigging and adapting the camera rigging to incorporate the camera;
        a connector fitting disposed at the second end of the camera rigging and adapting the camera rigging for connection to at least one of a pneumatic hose, a utility line, and a drill bit; and
        means for minimizing snow plowing in the tunnel when the camera rigging travels through the tunnel comprising at least one of:
            (i) a first end of the connector fitting comprising an outer surface having a rounded over or tapered portion;
            (ii) the camera guide comprising first and second tapered exterior surfaces; and
            (iii) the camera connector clamp comprising tapering conical portions.

2. The visual inspection system of claim 1 wherein the connector fitting comprises a cone portion centered in the frame and located in front of the camera such that it reflects an image peripheral to the axis of the camera within the field of view of the camera.

3. The visual inspection system of claim 2 wherein the connector fitting further comprises a passageway therethrough to enable compressed air to pass through the connector fitting when the camera rigging is connected to the pneumatic hose.

4. The visual inspection system of claim 1 wherein the camera connector clamp and the connector fitting are secured to the frame.

5. The visual inspection system of claim 4 wherein the camera guide positions the camera relative to the frame.

6. The visual inspection system of claim 5 wherein the cable extends through and is secured to the camera connector clamp.

7. The visual inspection system of claim 5 further comprising a tether that connects to the first end of the camera rigging for pulling the camera through the tunnel.

8. The visual inspection system of claim 7 further comprising a snap clip that releasably attaches the tether to the camera rigging.

9. The visual inspection system of claim 8 wherein the tether extends into an interior space of the camera connector clamp and is secured therein.

10. A camera rigging for a visual inspection system for use in underground pneumatic boring, the camera rigging having a first end and a second end opposite from the first end and being adapted to travel through a tunnel created in an underground boring operation, the camera rigging comprising:
    a frame comprising at least one elongated member;
    a camera connector clamp disposed at or adjacent to the first end of the camera rigging and adapting the camera rigging to clamp onto a cable that connects a camera to a display;
    a camera guide disposed at a location between the first and second ends of the camera rigging and adapting the camera rigging to incorporate the camera; and
    a connector fitting disposed at the second end of the camera rigging and adapting the camera rigging for connection to at least one of a pneumatic hose, a utility line, and a drill bit; and
    means for minimizing snow plowing in the tunnel when the camera rigging travels through the tunnel.

11. The camera rigging of claim 10 wherein the means for minimizing snow plowing comprises at least one of:
    (i) a first end of the connector fitting comprising an outer surface having a rounded over or tapered portion;
    (ii) the camera guide comprising first and second tapered exterior surfaces; and
    (iii) the camera connector clamp comprising tapering conical portions.

12. The camera rigging of claim 10 wherein the connector fitting comprises a cone portion centered in the frame and located in front of the camera such that it reflects an image peripheral to the axis of the camera within the field of view of the camera.

13. The camera rigging of claim 12 wherein the connector fitting further comprises a passageway therethrough to enable compressed air to pass through the connector fitting when the camera rigging is connected to the pneumatic hose.

14. A visual inspection system for use in an underground boring operation comprising:
    a camera;
    a display;
    a cable connecting the camera to the display; and
    a camera rigging adapted to travel through a tunnel created in the underground boring operation, the camera rigging having a first end and a second end opposite from the first end, the camera rigging comprising:

a frame comprising at least one elongated member;

a camera connector clamp disposed at or adjacent to the first end of the camera rigging and adapting the camera rigging to clamp onto the cable;

a camera guide disposed at a location between the first and second ends of the camera rigging and adapting the camera rigging to incorporate the camera;

a connector fitting disposed at the second end of the camera rigging and adapting the camera rigging for connection to at least one of a pneumatic hose, a utility line, and a drill bit; and wherein the connector fitting has a first end and a second end opposite from the first end, the connecting fitting defining a first hole extending through the first end and a second hole extending through the second end, the first hole being configured to receive the frame, the second hole being configured to receive the at least one of the pneumatic hose, the utility line, and the drill bit.

15. The visual inspection system of claim 14 wherein the connector fitting includes first internal threads disposed in the first hole for threadingly connecting to the frame, and the connector fitting includes second internal threads disposed in the second hole for threadingly connecting to the at least one of the pneumatic hose, the utility line, and the drill bit.

16. The visual inspection system of claim 14 further comprising means for minimizing snow plowing in the tunnel when the camera rigging travels through the tunnel comprising at least one of:
(i) a first end of the connector fitting comprising an outer surface having a rounded over or tapered portion;
(ii) the camera guide comprising first and second tapered exterior surfaces; and
(iii) the camera connector clamp comprising tapering conical portions.

17. The visual inspection system of claim 14 wherein the connector fitting comprises a cone portion centered in the frame and located in front of the camera such that it reflects an image peripheral to the axis of the camera within the field of view of the camera.

18. The visual inspection system of claim 14 wherein the connector fitting further comprises a passageway therethrough to enable compressed air to pass through the connector fitting when the camera rigging is connected to the pneumatic hose.

19. A camera rigging for a visual inspection system for use in underground pneumatic boring, the camera rigging having a first end and a second end opposite from the first end and being adapted to travel through a tunnel created in an underground boring operation, the camera rigging comprising:

a frame comprising at least one elongated member;

a camera connector clamp disposed at or adjacent to the first end of the camera rigging and adapting the camera rigging to clamp onto a cable that connects a camera to a display;

a camera guide disposed at a location between the first and second ends of the camera rigging and adapting the camera rigging to incorporate the camera; and a connector fitting disposed at the second end of the camera rigging and adapting the camera rigging for connection to at least one of a pneumatic hose, a utility line, and a drill bit; and wherein the connector fitting has a first end and a second end opposite from the first end, the connecting fitting defining a first hole extending through the first end and a second hole extending through the second end, the first hole being configured to receive the frame, the second hole being configured to receive the at least one of the pneumatic hose, the utility line, and the drill bit.

20. The camera rigging of claim 19 wherein the camera guide has a slit extending through a portion thereof and an aperture extending perpendicular to the slit for receiving a fastener to secure the camera within the camera guide.

21. The camera rigging of claim 19 wherein the camera is secured within the camera guide using a fastener that extends through the camera guide and engages the camera.

22. The camera rigging of claim 19 further comprising a pair of guide wipers that are configured to engage the tunnel to form a seal therebetween, wherein the camera guide is located between the camera connector clamp and the connector fitting, and each of the guide wipers are secured to one of the camera guide and the connector fitting.

23. The camera rigging of claim 19 wherein the connector fitting includes first internal threads disposed in the first hole for threadingly connecting to the frame, and the connector fitting includes second internal threads disposed in the second hole for threadingly connecting to the at least one of the pneumatic hose, the utility line, and the drill bit.

24. The camera rigging of claim 19 wherein the connector fitting comprises a cone portion centered in the frame and located in front of the camera such that it reflects an image peripheral to the axis of the camera within the field of view of the camera.

25. The camera rigging of claim 24 wherein the connector fitting further comprises a passageway therethrough to enable compressed air to pass through the connector fitting when the camera rigging is connected to the pneumatic hose.

26. The camera rigging of claim 19 wherein the camera connector clamp and the connector fitting are secured to the frame.

27. The camera rigging of claim 26 wherein the camera guide is configured to position the camera relative to the frame.

28. The camera rigging of claim 27 wherein the camera connector clamp is configured to secure the cable relative to the frame.

29. The camera rigging of claim 28 wherein the at least one elongated member includes flexible rope.

30. The camera rigging of claim 29 further comprising fasteners threaded into apertures in the camera connector clamp and the connector fitting to secure the camera connector clamp and the connector fitting to the frame.

31. The camera rigging of claim 28 wherein the camera connector clamp includes a pair of body members joined together by fasteners.

32. The camera rigging of claim 31 wherein the body members define a pair of grooves that are configured to receive the cable.

33. The camera rigging of claim 31 wherein the camera connector clamp includes a hinge and the body members pivot about the hinge.

34. The camera rigging of claim 31 wherein the camera connector clamp includes a bulb that is configured to clamp onto the cable, the body members cooperating to form a pocket that receives and retains the bulb.

35. The camera rigging of claim 31 wherein the at least one elongated member includes a plurality of rigid rods.

36. The camera rigging of claim 35 wherein the rigid rods have L-shaped ends and the body members define grooves that receive and retain the L-shaped ends to secure the camera connector clamp to the frame.

37. The camera rigging of claim 36 wherein the rigid rods have threaded ends opposite the L-shaped ends that engage female threads formed in the connector fitting to secure the connector fitting to the frame.

* * * * *